(12) United States Patent
Potash

(10) Patent No.: US 12,099,803 B2
(45) Date of Patent: Sep. 24, 2024

(54) TRAINING A MODEL IN A DATA-SCARCE ENVIRONMENT USING ADDED PARAMETER INFORMATION

(71) Applicant: Microsoft Technology Licensing, LLC, Redmond, WA (US)

(72) Inventor: Peter Joseph Potash, Toronto (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 700 days.

(21) Appl. No.: 17/321,161

(22) Filed: May 14, 2021

(65) Prior Publication Data
US 2022/0366133 A1 Nov. 17, 2022

(51) Int. Cl.
*G06F 40/00* (2020.01)
*G06F 16/93* (2019.01)
(Continued)

(52) U.S. Cl.
CPC ............ *G06F 40/216* (2020.01); *G06F 16/93* (2019.01); *G06N 3/08* (2013.01)

(58) Field of Classification Search
CPC .... G06F 8/30; G06F 8/33; G06F 8/73; G06N 3/08; G06N 7/04; G06N 3/088; G06N 3/0895; G06N 3/09; G06N 3/092; G06N 3/084; G06N 3/082; G06N 3/02; G06N 3/0442; G06N 3/044; G06N 3/0455; G06N 3/045; G06N 3/0464; G06N 3/0475; G06N 3/048; G06N 3/047; G06N 7/01; G06N 20/10; G06N 20/00; G06N 20/20; G06Q 10/06375; G06Q 10/103; G06Q 10/101
See application file for complete search history.

(56) References Cited

U.S. PATENT DOCUMENTS 8,595,213 B2 * 11/2013 Schaefer ................. G06F 8/437
707/713
11,768,831 B2 * 9/2023 Scholak ................ G06F 16/243
707/760
(Continued)

OTHER PUBLICATIONS

Puri, R., & Catanzaro, B. (2019). Zero-shot text classification with generative language models. arXiv preprint arXiv:1912.10165. (Year: 2019).*
(Continued)

*Primary Examiner* — Edgar X Guerra-Erazo

(57) ABSTRACT

A training process produces a machine-learned model that, once trained, can be applied to process different types of data items. The training process accomplishes this result by combining data items in a training set with type-specific parameter information, to produce supplemented data items. The training process then trains a model based on the supplemented data items. Training involves adjusting model weights together with the type-specific parameter information. In an inference stage of processing, the technology combines a new data item with an appropriate type of trained parameter information, and then maps the resultant supplemented data item to an output data item. The technology is particularly effective in adapting an initial model to a new subject matter domain in those situations in which a robust set of data items that pertain to the subject matter domain and which have a desired type is lacking.

20 Claims, 16 Drawing Sheets

(51) Int. Cl.
*G06F 40/216* (2020.01)
*G06N 3/08* (2023.01)

(56) References Cited

U.S. PATENT DOCUMENTS

| | | | |
|---|---|---|---|
| 2021/0279608 A1* | 9/2021 | Tsuchiya | G06N 5/04 |
| 2021/0366581 A1* | 11/2021 | Lee | G16C 60/00 |
| 2022/0229983 A1* | 7/2022 | Zohrevand | G06N 20/20 |
| 2022/0244937 A1* | 8/2022 | Prasad | G06N 5/022 |
| 2022/0309360 A1* | 9/2022 | Zohrevand | G06N 20/00 |
| 2022/0335255 A1* | 10/2022 | Zohrevand | G06F 18/211 |
| 2022/0358125 A1* | 11/2022 | Scholak | G06F 16/24522 |

OTHER PUBLICATIONS

Radford, et al., "Language Models are Unsupervised Multitask Learners," available at https://openai.com/blog/better-language-models/in, in OpenAI blog, Feb. 2019, 24 pages.

Vaswani, et al., "Attention is All you Need," in Advances in Neural Information Processing Systems 30 (NIPS 2017), 2017, 11 pages.

Devlin, et al., "BERT: Pre-training of Deep Bidirectional Transformers for Language Understanding," arXiv:1810.04805v2 [cs.CL], May 24, 2019, 16 pages.

Kumar, et al., "Data Augmentation Using Pre-trained Transformer Models," in Proceedings of the Second Workshop on Life-long Learning for Spoken Language Systems, Dec. 2020, pp. 18-26.

\* cited by examiner

EXAMPLE OF INFERENCE-STAGE PROCESSING

OVERVIEW OF OPERATION OF THE TRAINING SYSTEM 1302

OBTAIN FIRST-TYPE DATA ITEMS THAT PERTAIN TO A FIRST TYPE OF DATA ITEMS.
1304

OBTAIN SECOND-TYPE DATA ITEMS THAT PERTAIN TO A SECOND TYPE OF DATA ITEMS, THE SECOND TYPE DIFFERING FROM THE FIRST TYPE, THE FIRST-TYPE DATA ITEMS AND THE SECOND-TYPE DATA ITEMS PERTAINING TO AT LEAST ONE ORIGINAL SUBJECT MATTER DOMAIN.
1306

COMBINE THE FIRST-TYPE DATA ITEMS WITH FIRST-TYPE PARAMETER INFORMATION THAT PERTAINS TO THE FIRST TYPE, TO PRODUCE FIRST-TYPE SUPPLEMENTED DATA ITEMS.
1308

COMBINE THE SECOND-TYPE DATA ITEMS WITH SECOND-TYPE PARAMETER INFORMATION THAT PERTAINS TO THE SECOND TYPE, TO PRODUCE SECOND-TYPE SUPPLEMENTED DATA ITEMS.
1310

TRAIN AN INITIAL MACHINE-LEARNED MODEL FOR USE IN EACH SUBJECT MATTER DOMAIN OF THE AT LEAST ONE ORIGINAL SUBJECT MATTER DOMAIN BASED ON THE PLURALITY OF FIRST-TYPE SUPPLEMENTED DATA ITEMS AND THE PLURALITY OF SECOND-TYPE SUPPLEMENTED DATA ITEMS, THE TRAINING ALSO RESULTING IN TRAINING THE FIRST-TYPE PARAMETER INFORMATION AND THE SECOND-TYPE PARAMETER INFORMATION.
1312

OVERVIEW OF OPERATION OF THE INFERENCE-STAGE SYSTEM 1702

INPUT A NEW DATA ITEM OF THE SECOND TYPE.
1704

COMBINE THE NEW DATA ITEM WITH SECOND-TYPE PARAMETER INFORMATION THAT HAS BEEN TRAINED IN A PRECEDING TRAINING PROCESS, TO PRODUCE A SUPPLEMENTED NEW DATA ITEM.
1706

MAP THE SUPPLEMENTED NEW DATA ITEM TO AN OUTPUT DATA ITEM BASED ON MODEL WEIGHTS THAT HAVE ALSO BEEN TRAINED IN THE PRECEDING TRAINING PROCESS.
1708

THE PRECEDING TRAINING PROCESS INVOLVING:
(1708-1) TRAINING AN INITIAL MACHINE-LEARNED MODEL BASED ON FIRST-TYPE SUPPLEMENTED DATA ITEMS THAT PERTAIN TO THE FIRST TYPE, AND BASED ON SECOND-TYPE SUPPLEMENTED DATA ITEMS THAT PERTAIN TO THE SECOND TYPE, THE FIRST-TYPE SUPPLEMENTED DATA ITEMS AND THE SECOND-TYPE SUPPLEMENTED DATA ITEMS PERTAINING TO AT LEAST ONE ORIGINAL SUBJECT MATTER DOMAIN, THE FIRST-TYPE SUPPLEMENTED DATA ITEMS BEING PRODUCED BY COMBINING RESPECTIVE FIRST-TYPE DATA ITEMS WITH FIRST-TYPE PARAMETER INFORMATION, AND THE SECOND-TYPE SUPPLEMENTED DATA ITEMS BEING PRODUCED BY COMBINING RESPECTIVE SECOND-TYPE DATA ITEMS WITH THE SECOND-TYPE PARAMETER INFORMATION; AND
(1708-2) REFINING THE INITIAL MACHINE-LEARNED MODEL BASED ON SUPPLEMENTED NEW-DOMAIN DATA ITEMS TO PRODUCE A FINE-TUNED MACHINE-LEARNED MODEL, THE SUPPLEMENTED NEW-DOMAIN DATA ITEMS PERTAINING TO A NEW SUBJECT MATTER DOMAIN THAT IS NOT INCLUDED IN THE AT LEAST ONE ORIGINAL SUBJECT MATTER DOMAIN.

FIG. 17

TRAINING A MODEL IN A DATA-SCARCE ENVIRONMENT USING ADDED PARAMETER INFORMATION

BACKGROUND

A machine-learned model that is developed for use in a target environment offers good performance when it is trained on examples collected from the same target environment. For example, a machine-learned model that is developed for analyzing a user's question regarding a particular technical field works best when it is trained on many other questions pertaining to the same technical field. However, a developer may not have a large amount of examples that are directly relevant to a target environment. Indeed, in some cases, the developer may have no relevant examples. This issue complicates the process of training the model. It can also result in the production of a model that offers substandard performance, relative to a model that is trained on examples taken from the target environment.

SUMMARY

Technology is described herein for training a machine-learned model ("model") that, once trained, can be applied to process different types of data items. The technology accomplishes this result by combining data items in a training set with type-specific parameter information. For example, for a data item that pertains to a first type, the technology combines the data item with first-type parameter information. For a data item that pertains to a second type, the technology combines the data item with second-type parameter information. This operation yields supplemented data items. The technology then trains an initial model based on the supplemented data items. Training involves iteratively adjusting the model weights of the initial model together with the parameter information.

According to another aspect, the training process can also refine the initial model to operate in a new subject matter domain that is not well represented by the training set used to produce the initial model. The technology achieves this result by appending appropriate parameter information to whatever data items are available that pertain to the new subject matter domain, to produce supplemented new-domain data items. It then performs additional training on the initial model based on the supplemented new-domain data items, to produce a fine-tuned model.

According to another aspect, in an inference stage of processing, the technology combines a new data item with an appropriate type of parameter information that has been trained in the training process. For example, if the new data item is of the second type, the technology combines it with the second-type parameter information. This operation yields a supplemented new data item. The technology then uses the model that has been trained in the training process (e.g., the fine-tuned model) to map the supplemented new item into an output data item.

According to one technical merit, the technology can produce a trained model that offers good performance for different target environments, even in the absence of a robust training set pertaining to all of those training environments. For example, the technology can adapt the initial model to a new subject matter domain using data items of the first type, e.g., because data items of the second type are not available (or not available in sufficient quantity). Once trained, the technology can use the resultant fine-tuned model to process data items of the second type that are associated with this new subject matter domain. This ability is possible because the training process, via its use of trainable parameter information appended to the data items, effectively learns how to transfer knowledge that it acquires across different types of data items, even without the benefit of training performed on actual data items of a particular type.

According to another technical benefit, the technology, by virtue of its use of type-specific parameter information, can produce a trained model that achieves a desired performance goal more quickly, and with reduced consumption of system resources, compared to a training strategy that does not make use of type-specific parameter information.

Consider the following non-limiting example. The technology can develop an initial model for use in providing query suggestions to the user, based on the user's submission of a question or part of a question. The technology can later adapt the initial model to a new subject matter domain. But assume that that a training set is not available that contains questions taken from the new subject matter domain. The technology addresses this challenge by refining the initial model based on general-purpose document text items extracted from websites that pertain to the subject matter domain. This text information is not of the desired type because it includes text that serves the primary purpose of disclosing information, rather than asking questions. Nevertheless, through the above-described use of machine-learned parameter information, the technology can extend the knowledge it learns from the document text items to questions for the new subject matter domain. In the inference stage, the technology combines a user's question with question parameter information to produce a supplemented data item, and then processes the resultant supplemented data item.

The above-summarized technology can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 13 and 14 together show a process that represents an overview of one manner of operation of the training system of FIG. 1.

FIG. 17 shows a process that represents an overview of one manner of operation of the inference-stage system of FIG. 1.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a training system for producing a machine-learned model. Section A also describes an inference-stage system for applying the machine-learned model. Section B sets forth illustrative methods which explain the operation of the systems of Section A. And Section C describes illustrative computing functionality that can be used to implement any aspect of the features described in Sections A and B.

A. Illustrative Computing System

Figure 1:
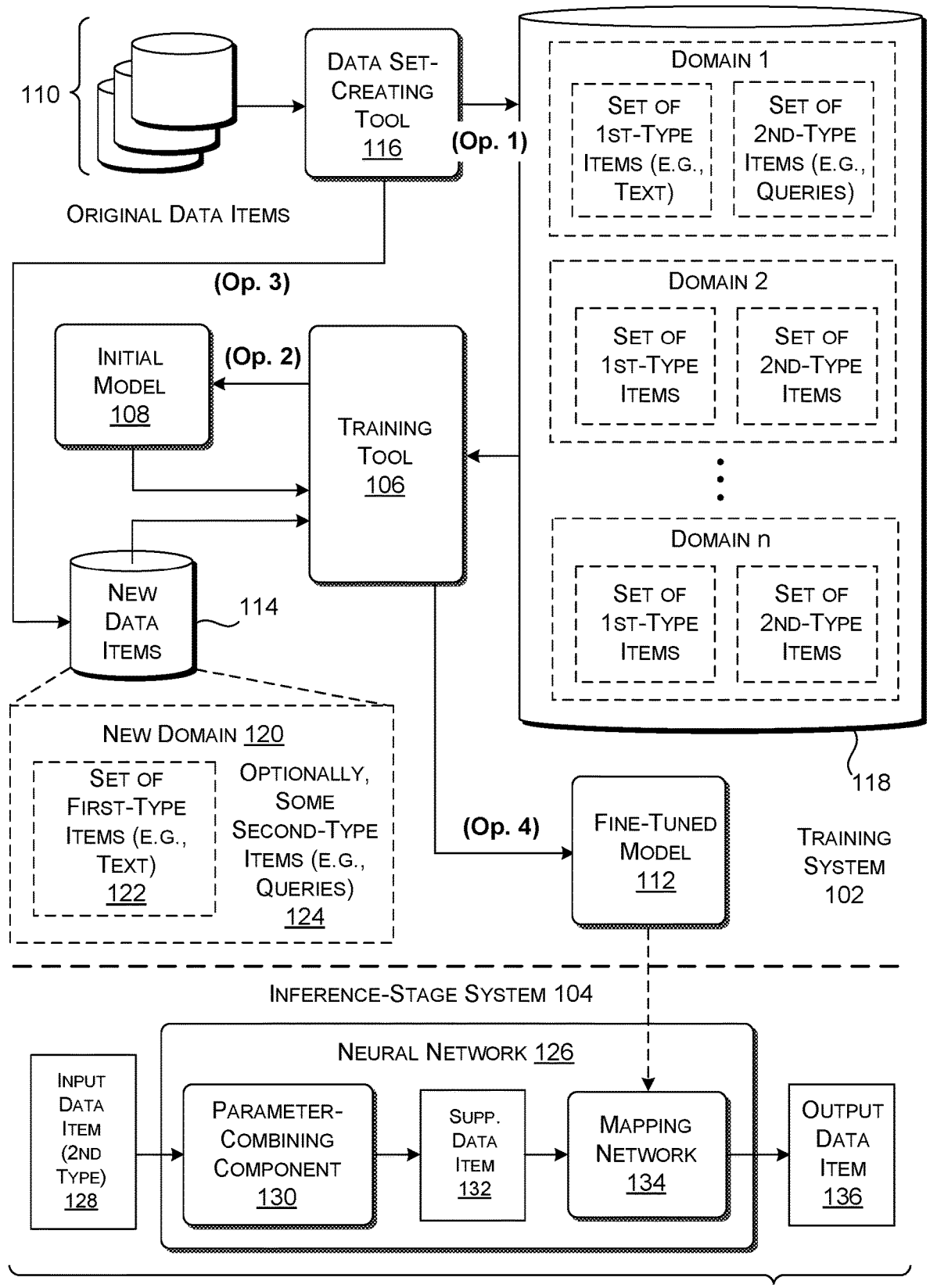
FIG. 1 shows an illustrative training system for producing a machine-learned model ("model"), and an inference-stage system for applying the model.

FIG. 1 shows an overview of a training system 102 for producing a machine-learned model ("model" henceforth) and an inference-stage system 104 for applying the model once trained. In other words, the training system 102 provides functionality for creating a model based on training examples, while the inference-stage system 104 provides functionality by which end users can interact with the trained model.

In some non-limiting cases, the model trained by the training system 102 can provide query suggestions to a user in response to the user's submission of a question or part of a question. For example, assume that the user inputs the partial question "What are the memory" in the context of investigating a software-related collection of documents. The model can provide a suggestion to the user that reads "What are the memory requirements of GameX software?" (where "GameX" is the name of a software product). However, this kind of model is just one example; the functionality shown in FIG. 1 can be used to produce different kinds of models that performs different respective functions, including different types of text-processing functions, different types of image-processing functions, different types of audio-processing functions, etc. The following description will initially explain the operation of the training system 102 and the inference-stage system 104 in general terms that apply to any target environment, both in terms of the kinds of data items used in the training process and the function(s) performed by the models produced by the training system 102. A "data item" generally refers to an instance of data. In the linguistic realm, a data item may include one or more words.

Beginning with the training system 102, FIG. 1 shows that the training system 102 includes a training tool 106 that produces an initial model 108 based on data items in one or more data stores 110, and then, at some later stage, produces a fine-tuned model 112 by performing additional training on the initial model 108 based on data items in a data store 114. In another case, the training system 102 ends its processing when it produces the initial model 108, which is then installed in the inference-stage system 104. In other words, the technical benefits of the training system 102 (to be described below) are manifested in both the initial model 108 and the fine-tuned model 112.

In a first phase of operation, a data set-creating tool 116 ("creating tool" for brevity) produces a training set, which it stores in a data store 118. Details of the operation of the creating tool 116 will be set forth below. By way of introduction, the creating tool 116 collects data items from the data store(s) 110 that represent at least two kinds of data items. In some implementations, the creating tool 116 also collects data items that pertain to different subject matter domains.

A subject matter domain ("domain" for brevity) refers to a topic with which a data item is associated. For example, assume that the data item corresponds to a question having one or more words. The domain associated with this question refers to the topic with which it is most closely associated. For example, a question that reads "What is the weather in Seattle?" belongs to a weather-related domain, while a question that reads "How do I turn on the auto-reply option in Outlook?" belongs to a software-related domain relating to the software product OUTLOOK, produced by Microsoft Corporation of Redmond, Washington.

In the linguistic realm, the "type" of a data item, on the other hand, refers to a kind of discourse that may take place within a subject matter domain. For example, a first type of data item may refer to a sentence or other unit of text within a document that pertains to a particular topic, such as a sentence within a Wikipedia article relating to the topic. A second type of data item may refer to a question that a user submits to a search engine relating to the particular topic. In many cases, the type of discourse reflects a source from which a data item originates, as different sources often operate on data items of different types.

To simplify explanation, the following description will focus on an example in which the first type of data item refers to a passage of text extracted from a document, while the second type of data item refers to passage of text that is presented as a question to some query-processing engine, such as a commercial search engine. The first type of data item is referred to as a "document text item" (or, with more brevity, a "text item"), while the second type of data item is referred to as a "question" or "query" (which are used interchangeably). More specifically, FIG. 1 shows that the creating tool 116 generates a plurality of data groups associated with respective domains. For each domain, the creating tool 116 identifies at least two sets of data items: a first set that includes data items of a first type; and a second set that includes data items of a second type. For example, the first set of data items may correspond to text items associated with a particular domain that have been extracted from general-purpose text documents, while the second set of data items may correspond queries associated with the same domain as the first set. The domains in the data store 118 may be regarded as original subject matter domains because the training tool 106 generates the initial model 108 based on the data items pertaining to these domains.

As will be described in greater detail below, the creating tool 116 can extract these data items from the data store(s) 110 based on information provided in a query log (not shown) of a search engine (not shown). For example, the creating tool 116 can use the query log to identify a query that a user has submitted, which was followed by the user clicking on a particular document. As a result of the processing operations described below (e.g., in connection with the explanation of FIG. 6), the creating tool 116 identifies the subject matter domain associated with the document. This allows the creating tool 116 to conclude that both the query and a text passage extracted from the document are associated with the identified domain, the text passage being an example of a first-type data item and the query being an example of a second-type data item.

Note that the principles set forth herein can be applied to other classifications of data items. For example, in the linguistic realm, the creating tool 116 can discriminate between instances of text exchanged in conversation among users (e.g., in blogs, social media messages, etc.) from instances of text found in more formal technical documents. The creating tool 116 can correspondingly assign different respective types to these two types of discourse. The training system 102 could learn a model that translates knowledge expressed in technical literature to a conversational style, and vice versa. The same principles hold true in implementations that process non-linguistic data items, or data items that are not entirely composed of linguistic items. For example, the creating tool 116 can discriminate between a first kind of image that is embedded in a document and a second kind of image that is posted by a user on a social media platform, etc. Further still, although the example in FIG. 1 involves discriminating between two types of data items, the creating tool 116 can discriminate among three or more types of data items, e.g., by assigning a first type of data item to TWITTER messages, a second type of data item to blog posts, and a third type of data item to passages extracted from online articles, etc.

The training tool 106 begins its processing of a batch of data items with the preparatory step of combining parameter information with each data item in the batch. More specifically, for each data item of the first type (e.g., text type), the training tool 106 prepends first-type parameter information (e.g., text parameter information). For each data item of the second type (e.g., query type), the training tool 106 prepends second-type parameter information (e.g., query parameter information). Each instance of parameter information can be expressed as a sequence having one or more vectors, such as, in one non-limiting case, a sequence of five vectors. This operation produces supplemented data items.

The training tool 106 iteratively processes the supplemented data items to produce the initial model 108. This training process is described in detail below with respect to FIG. 2-5. By way of introduction to that later description, the training process involves iteratively adjusting model weights of the initial model 108 based on a given loss function. The training process also involves adjusting the values in the parameter information. Hence, when finished, the training tool 106 produces a final set of model weights, trained first-type parameter information, and trained second-type parameter information.

The loss function applied by the training tool 106 can vary depending on the kind of model that is being trained. Consider the illustrative case of a query-suggestion model. Given a partial query, such a model will generate an appropriate query suggestion that is based on the partial query, e.g., in some cases, by completing the partial query. The training tool 106 can truncate queries in a set of queries, and then apply a loss function that rewards instances in which the initial model 108 expands an incomplete query in a correct manner (which happens when the initial model 108 correctly restores a query to its original form), and penalizes instances in which the initial model 108 expands an incomplete query in an incorrect manner (which happens when the initial model 108 fails to restore a query to its original form). The training tool 106 can apply the same loss function to text items.

In some implementations, the training tool 106 can perform the above-described predictive function for each word in a text passage. For example, given a first word in a text passage, the training tool 106 can attempt to predict the second word of the text passage. Given the first two words in the text passage, the training tool 106 attempts to predict the third word, and so on.

Optionally, the training tool 106 can later refine the initial model 108 so that it operates in a new domain 120. The new domain 120 is said to be "new" because it corresponds to a subject matter domain that is not among the original subject matter domains that were used to organize the original data items in the data store 118 (where those original data items were used to generate the initial model 108). In some implementations, the creating tool 116 can generate both a new set of first-type new-domain data items 122 and a new set of second-type new-domain data items 124 pertaining to the new domain 120. For example, as the first-type new-domain data items 122, the creating tool 116 can produce a set of text items extracted from documents that pertain to the new domain 120. As the second-type new-domain data items 124, the creating tool 116 can produce a set of queries that pertain to the same new domain 120. In other cases, the creating tool 116 may lack a robust collection of either the first-set data items or the second-set data items. For example, assume that the creating tool 116 finds a set of general-purpose text items pertaining to the new domain 120, but there presently does not exist any queries pertaining to the new domain 120. Or assume that the creating tool 116 finds some queries relating to the new domain 120, but not a large enough number of queries that would be sufficient to train a machine-learned model for the new domain 120 to achieve specified performance goals (absent the use of trained parameter information described herein). For example, assume that the creating tool 116 ensures that each set of queries in the data store 118 (for use in constructing the initial model 108) has at least a prescribed number of queries. The set of second-type new-domain data items 124 may be considered deficient, even if non-zero, because it contains less than the prescribed number. A "new-domain data item" generally refers to a data item that pertains to the new domain 120 that is used to train the fine-tuned model 112.

The training tool 106 begins its processing of the new-domain data items by appending parameter information that it has previously trained in the course of producing the initial model 108. For example, the training tool 106 prepends first-type parameter information to each first-type new-domain data item, e.g., by prepending text parameter information to each text item. It also prepends second-type parameter information to each second-type new-domain data item, e.g., by prepending query parameter information to each query (if any). This produces supplemented new-domain data items. The training tool 106 then updates the initial model 108 based on the supplemented new-domain data items, to produce the fine-tuned model 112.

Now turning to the application phase, the inference-stage system 104 can be implemented as a neural network 126, in which different parts of the neural network 126 perform different respective functions. The inference-stage system 104 can incorporate the fine-tuned model 112 (or the initial model 108). In some implementations, for example, the inference-stage system 104 uses the fine-tuned model 112 that was developed for the new domain 120 to interrogate a corpus of documents in a data store (not shown) that pertain to the new domain 120. In this scenario, the inference-stage system 104 will generate query suggestions that are appropriate for the new domain 120.

More generally, in a first operation, the inference-stage system 104 receives a new data item 128, such as a new query. Next, a parameter-combining component 130 combines the new data item 128 with appropriate parameter information that has been trained by the training system 102. For example, the parameter-combining component 130 can combine trained query parameter information with the new data item 128 if the new data item 128 pertains to a query submitted by a user. This produces a supplemented data item 132. A mapping network 134 then maps the supplemented data item 132 to an output data item 136. The mapping network 134 itself is a neural network that performs its mapping function based on a model produced by the training system 102, e.g., corresponding to the initial model 108 or the fine-tuned model 112.

In summary, in operation 1 (Op. 1), the creating tool 116 creates an initial training set, which it stores in the data store 118. In operation 2 (Op. 2), the training tool 106 produces the initial model 108 based on the training set. In operation 3 (Op. 3), the creating tool 116 creates a new training set for the new domain 120. In operation 4 (Op. 4), the training tool 106 updates the initial model 108 based on the new training set, to produce the fine-tuned model 112. Operations 3 and 4 can be repeated any number of times as appropriate to accommodate new application environments. In operation 5 (Op. 5), the inference-stage system 104 uses the trained model to map the new data item 128 to the output data item 136.

Consider the case in which the user inputs a query to the inference-stage system 104 directed to the new domain 120, yet the fine-tuned model 112 was not trained based on any queries that pertain to the new domain 120. That is, the training set associated with the new domain 120 entirely omits the set of second-type new-domain data items 124. Nevertheless, the training tool 106 has processed a robust set of first-type new-domain data items 122 (e.g., text items). The training tool 106 also learns the relationship between text items and queries. This enables the fine-tuned model 112 to effectively transfer knowledge that is has learned from processing text items to queries. This, in turn, enables the inference-stage system 104 to provide an appropriate query suggestion to the user, upon the user's input of a query pertaining to the new domain 120.

The above-described scenario demonstrates how the training system 102 provides an effective tool for dealing with the problem of data-scarce environments. The above scenario describes a data-scarce environment because the training system 102 seeks to develop a query-suggestion model for the new domain 120 without also having a robust data set of queries that are pertinent to the new domain 120. Without the training system 102, some developers may have responded to the problem of a data-scarce environment by simply abandoning the effort to develop a model until a pertinent training set can be compiled. Hence, the training system 102 serves to remove a potential roadblock in the development process, and to expedite the delivery of appropriate models to the marketplace.

The training system 102 can also be expected to produce high-quality output results compared to alternative strategies. To illustrate this point, consider an alternative technique in which a training system produces a fine-tuned model based on text items alone, but without performing training based on type-specific parameter information. Such a model may produce output results that most closely mirror the kinds of text items in the corpus of text items, rather than the questions. That is, the output results may have the style and construction of general-purpose text, not questions. The alternative system will not uniformly produce good results because it fails to adequately translate knowledge about general-purpose text items to the realm of questions.

The training system 102 also represents a time-efficient and resource-efficient way to develop machine-learned models in any environment, marked by data scarcity or not. For example, assume that a goal of a developer is to produce a trained model that exhibits a prescribed degree of accuracy, as reflected by any specified performance metric (such as percentage of correctly-completed queries). A corpus of general-purpose text documents may include many different kinds of sentences, including queries, but not limited to queries. Hence, an alternative system may eventually learn to generate acceptable-quality query suggestions based on such a corpus, even without the use of type-specific parameter information. But the training system 102 of FIG. 1 can be expected to more quickly learn to generate acceptable-quality query suggestions because, by virtue of its used of trainable parameter information, it learns to transfer knowledge from non-query text passages to queries. Moreover, by more quickly achieving desired performance goals, the training system 102 can consume less system resources compared to the alternative system. The system resources can include processing resources, memory resources, storage resources, etc.

Suppose, instead, that a developer, as a result of using an alternative technique that does not make use of type-specific parameter information, discovers that the model he or she has produced fails to provide acceptable results, e.g., because of the use of a deficient number of queries in the training set. That developer may choose to deal with this situation by periodically retraining the model as queries become available for the new domain 120. That is, the developer may repeatedly retrain the model over a span of time until it exhibits sufficient accuracy. This ad hoc process of refining a model for a new domain, however, slows the development of a satisfactory model compared to the performance of the training system 102 of FIG. 1, and consumes more system resources compared to the training system 102. In other words, the ad hoc process can be expected use more training cycles compared to the operation of the training system 102 of FIG. 1. It may also deliver uneven results based on different environment-specific situations.

The above-noted technical merits of the training system 102 and its resultant models are set forth in the spirit of illustration, not limitation. Other implementations of the training system 102 can exhibit yet other technical characteristics that can be considered beneficial.

Figure 2:
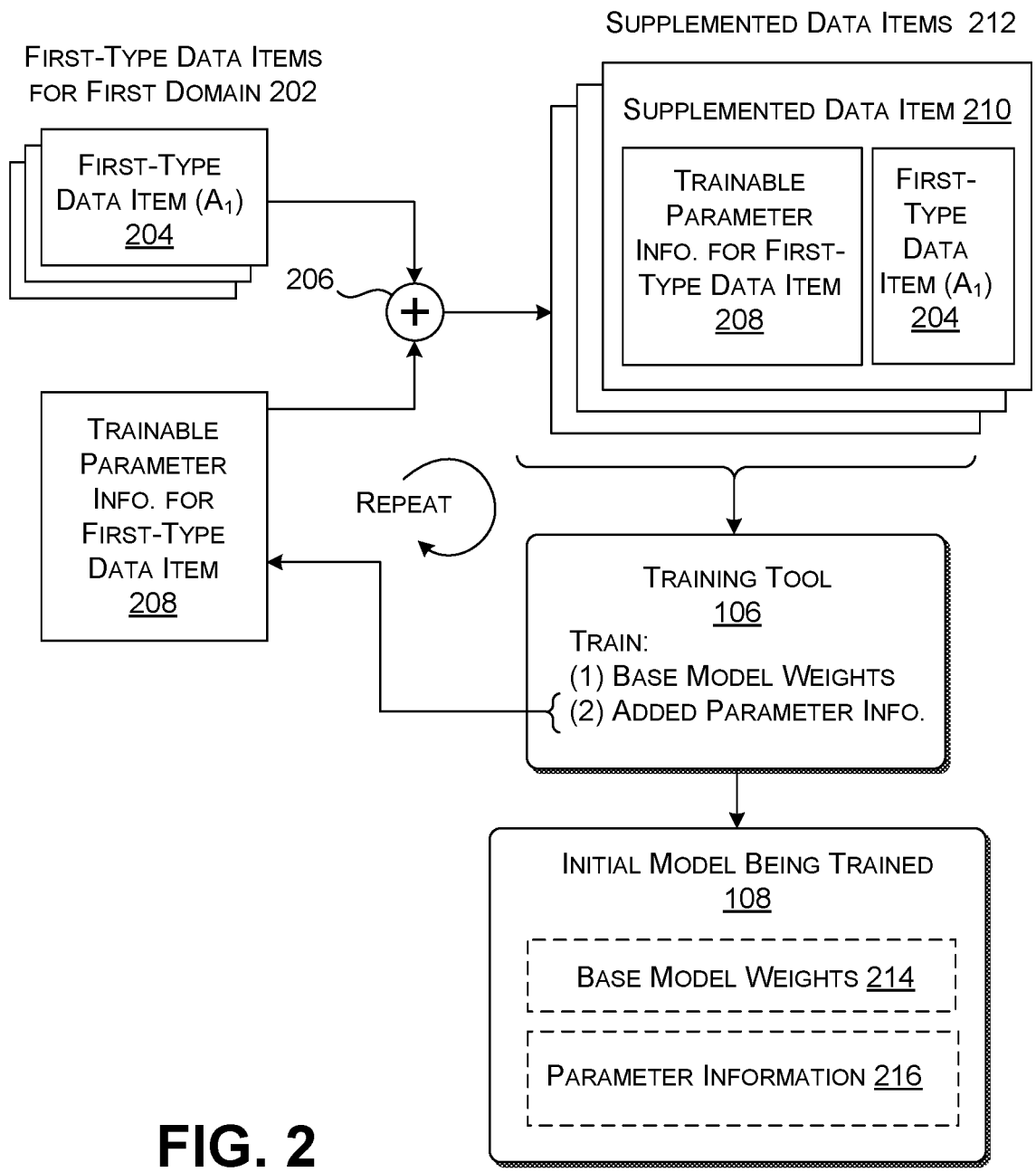
FIG. 2 shows an example of the operation of the training system of FIG. 1, when processing first-type data items (e.g., general-purpose document text items).
Figure 3:
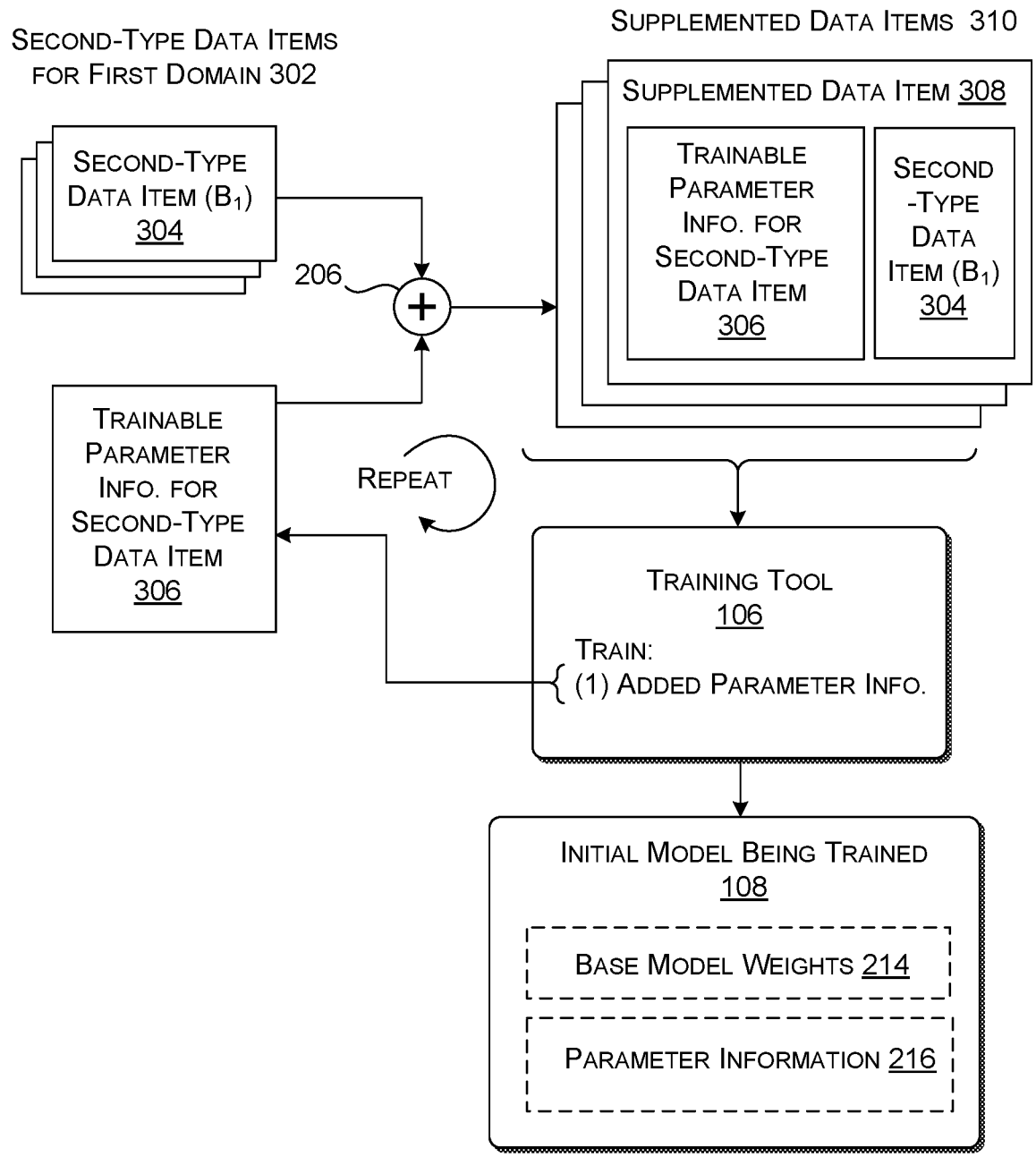
FIG. 3 shows an example of the operation of the training system of FIG. 1, when processing second-type data items (e.g., queries).

FIGS. 2 and 3 respectively show an illustrative manner in which the training tool 106 processes a batch-specific set of first-type data items 202 for a particular domain (with respect to FIG. 2) and a batch-specific set of second-type type items 302 for the particular domain (with respect to FIG. 3). For example, the first-type data items 202 may correspond to a set of general-purpose text items extracted from respective documents, where those documents pertain to the particular subject matter domain. The second-type data items 302 may correspond to a set of queries that resulted in selection of the documents in the set of first-type data items 202. These figures will be described in the context of processing performed on an illustrative first-type data item 204 (in FIG. 2) and an illustrative second-type data item 304 (in FIG. 3)

Beginning first with FIG. 2, the training tool 106 first uses a parameter-combining component 206 to combine the first-type data item 204 with first-type parameter information 208 in its current state, to produce a supplemented data item 210. For example, the parameter-combining component 206 can concatenate the first-type parameter information 208 with the first-type data item 204 by prepending the first-type parameter information 208 to the first-type data item 204. But other implementations can combine the first-type parameter information 208 with the first-type data item 204 in other ways, such as by adding the first-type parameter information 208 to the end of the first-type data item 204 (which can be optionally padded to a predetermined length). In yet other cases, the training tool 106 can combine the first-type data item 204 with the first-type parameter information 208 at some later stage of processing, not necessarily at a preliminary stage of processing as represented in FIG. 2. In yet other cases, the training tool 106 can introduce the first-type parameter information 208 at two or more stages of processing.

The training tool 106 then performs training based on the supplemented data item 210 (in combination with other supplemented data items 212 associated with other respective data items in a batch), to update the initial model 108. More specifically, the training tool 106 can use any iterative training technique (such as stochastic gradient descent) to update both: (1) the base model weights 214 of the initial model 108; and (2) the first-type parameter information 208. That is, the training tool 106 can use backpropagation to update the base model weights 214 based on calculated base weight gradients. The training tool 106 can use backpropagation to update the first-type parameter information 208 based on calculated parameter information gradients. At each stage of processing, the current stage of the initial model 108 is characterized by its base model weights 214 and the first-type and second-type parameter information 216.

Advancing to FIG. 3, the training tool 106 uses the parameter-combining component 206 to combine the second-type data item 304 with second-type parameter information 306 in its current state, to produce a supplemented data item 308. For example, the parameter-combining component 206 can concatenate the second-type parameter information 306 with the second-type data item 304 by prepending the second-type parameter information 306 to the second-type data item 304. Other combination strategies can alternatively be used, as mentioned above.

The training tool 106 then performs training based on the supplemented data item 308 (in combination with other supplemented data items 310 associated with other respective data items), to update the initial model 108. More specifically, the training tool 106 can use any iterative training technique (such as stochastic gradient descent) to update the second-type parameter information 306 based on calculated parameter information gradients. In some implementations, the training tool 106 does not also update the base model weights 214 of the initial model 108, unlike the updating operation shown in FIG. 2 performs for first-type data items.

From a more encompassing standpoint, in some implementations, the training tool 106 performs the above-described updating operation for each domain in the data store 118. For example, when processing the first domain, the training tool 106 can perform the processing shown in FIG. 2 for the text items associated with the domain, and can then perform the processing shown in FIG. 3 for the queries associated with the domain. At the close of the processing for each domain-specific batch, the training tool 106 will update the parameter information 216 and the base model weights 214. (More specifically, the base model weights 214 are updated as a result of the processing shown in FIG. 2, but not the processing shown in FIG. 3.) The training tool 106 then repeats the above-described processing for the second domain, and so on, until reaching the last domain of the training set. When processing each batch other than the first, the training tool 106 applies the parameter information 216 and base model weights 214 updated in the preceding batch-specific training phase.

The strategy of processing data items on a domain-by-domain basis allows the training tool 106 to incorporate insight form different domains in a structured manner. The strategy of processing text items prior to questions allows the training tool 106 to extend insight from text items to questions in a structured manner. Stated in another way, the above-described training approach reduces the chance that the training tool 106 will enter an unstable and/or unproductive region of a solution space, from which a satisfactory final solution is less likely to be achieved. With that said, other implementations can use different sequencing strategies in processing data items, such as by processing questions prior to text items for each domain. Further, other implementations can use different strategies that govern the timing at which the parameter information 216 is updated. It can be updated at a greater or lower frequency compared to the updating strategy described above. For example, the training tool 106 can update the parameter information 216 after processing a prescribed number of data items in a single batch.

Figure 4:
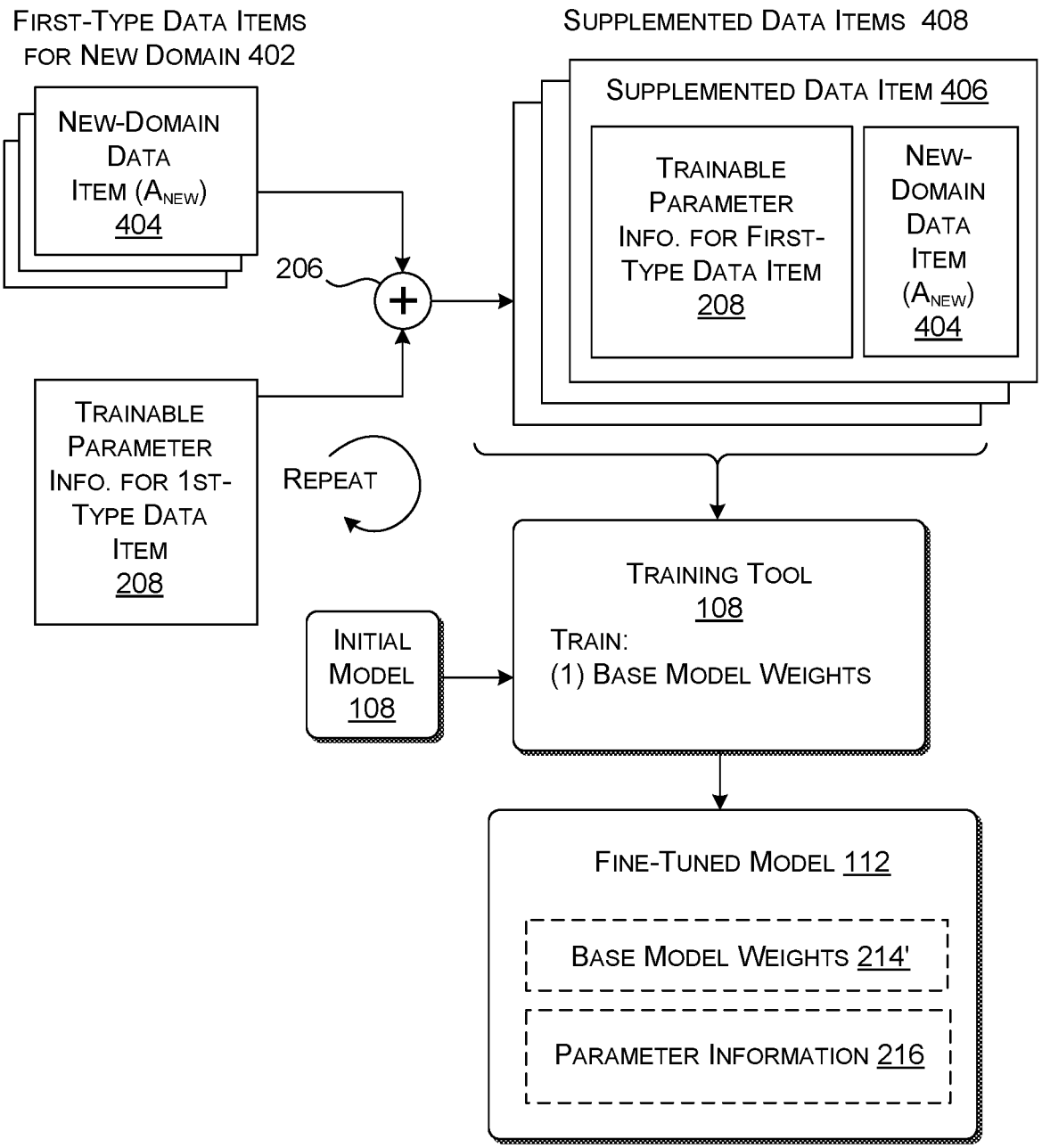
FIG. 4 shows an example of the operation of the training system of FIG. 1, when fine-tuning an initial model.

FIG. 4 shows an illustrative manner by which the training tool 106 refines the initial model 108 based on the new-domain data items in the data store 114, to produce the fine-tuned model 112. More specifically, assume that the training tool 106 performs updating based on a collection of new-domain data items 402 of the first type. For example the new-domain data items 402 may correspond to text items extracted from documents pertaining to the new domain 120. The operation of the fine-tuning operation will be described below with respect to a representative new-domain data item 404 of the first type.

First, the training tool 106 uses the parameter-combining component 206 to combine the new-domain data item 404 with the first-type parameter information 208 that has been produced in the preceding training operation. For example, the parameter-combining component 206 can concatenate the first-type parameter information 208 with the new-domain data item 404 by prepending the fist-type parameter information 208 to the new-domain data item 404. This produces a supplemented data item 406. Other ways of combining the first-type parameter information 208 with the new-domain data item 404 can be used, as described above.

The training tool 106 performs training of the fine-tuned model 112 by starting with the initial model 108. In other words, the fine-tuned model 112 may be viewed as a modification of the initial model 108. Each iteration of training involves updating the fine-tuned model 112 based on the supplemented data item 406 (in combination with other supplemented data items 408 associated with other respective new-domain data items). More specifically, the training tool 106 can use any iterative training technique (such as stochastic gradient descent) to update the model weights 214' of the fine-tuned model 112, e.g., based on calculated model weight gradients. In some implementations, the training tool 106 does not also update any of the parameter information 216 at this stage.

In other implementations, the training tool 106 can refine the initial model 108 based on both the first-type new-domain data items 122 and second-type new-domain data items 124 pertaining to the new domain 120, such as both text items and queries pertaining to the new domain 120. To perform this task, the parameter-combining component 206 combines each new-domain data item to be processed with the appropriate parameter information (e.g., first-type or second-type parameter information).

Figure 5:
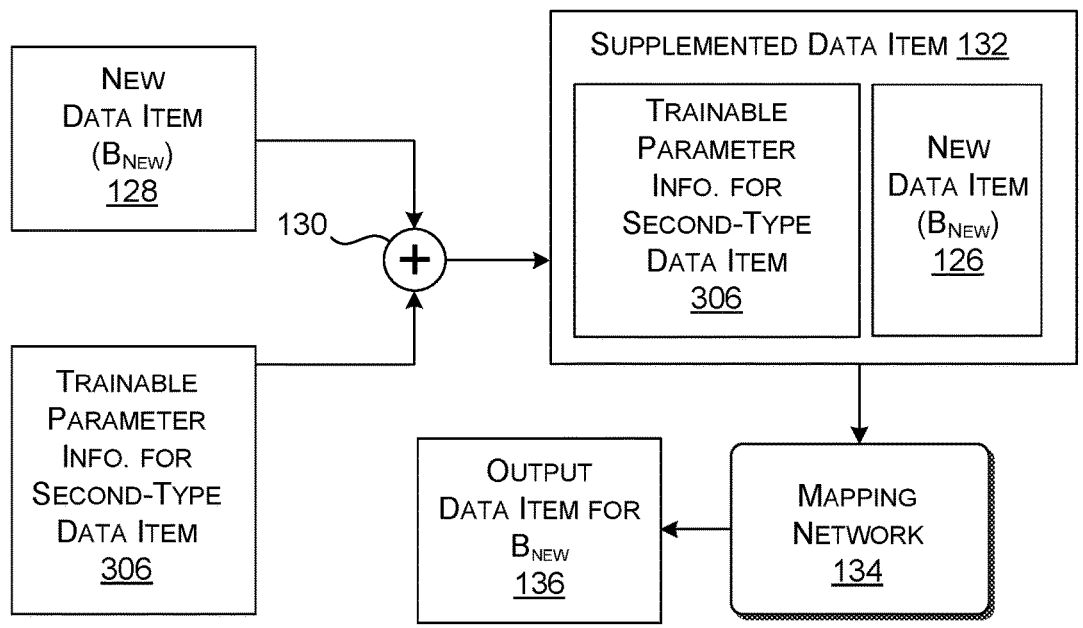
FIG. 5 shows an example of the operation of the inference-stage system of FIG. 1.

FIG. 5 shows an illustrative manner by which the inference-stage system 104 processes the new data item 128. Assume that the new data item 128 is of the second type, e.g., corresponding to a query. Further assume that the new data item 128 is associated with the new domain 120 for which the fine-tuned model 112 has been trained.

The parameter-combining component 130 combines the new data item 128 with the second-type parameter information 306 that has been trained in the course of producing the initial model 108. This operation yields the supplemented data item 132, which includes the trained second-type parameter information prepended to the new data item 128 (although other strategies for combining are possible). The mapping network 134 then maps the supplemented data item 132 to the output data item 136. For the case in which the fine-tuned model 112 is a query suggestion model, the output data item 136 is a query suggestion.

Figure 6:
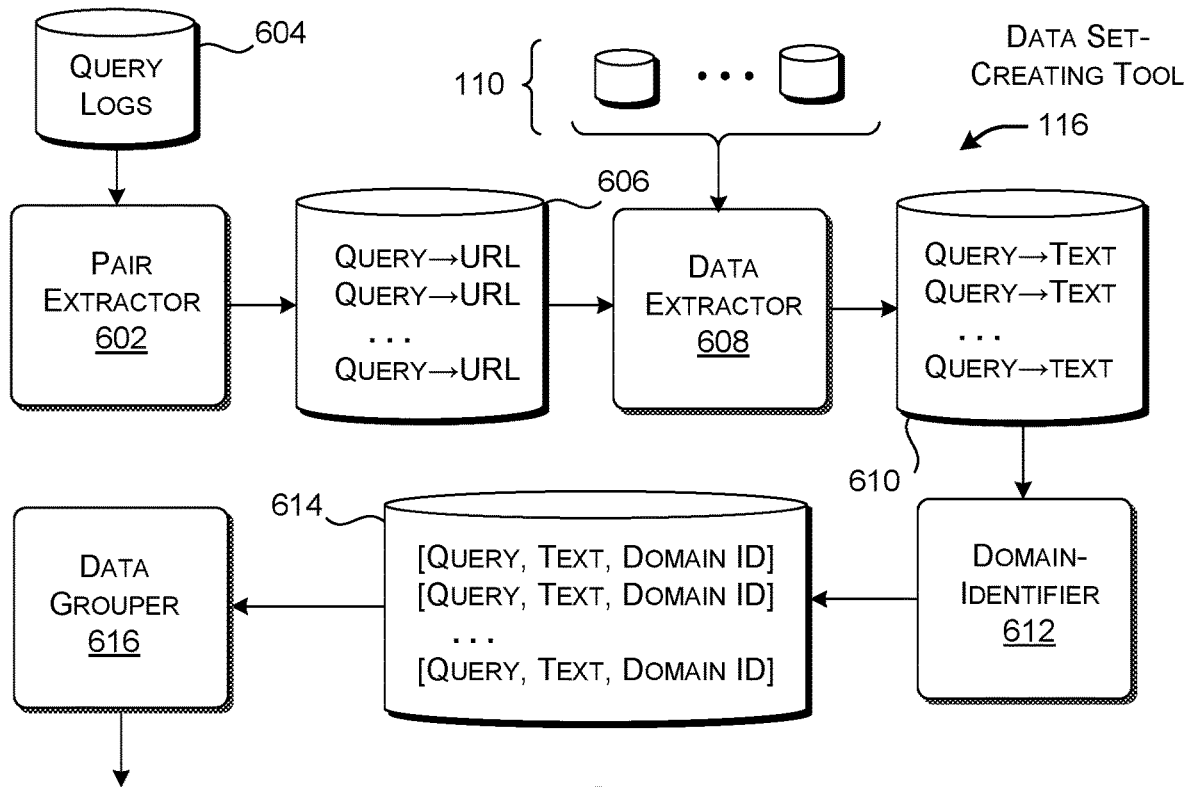
FIG. 6 shows one implementation of a data set-creating tool, which is a component of the training system of FIG. 1.

FIG. 6 shows one implementation of the data set-creating tool 116 ("creating tool" for brevity). Recall from the explanation of FIG. 1 that the creating tool 116 generates a training set that the training tool 106 uses to produce the initial model 108. The creating tool 116 will be described for the non-limiting example in which first-type data items correspond to text items and the second-type data items correspond to queries, although the creating tool 116 can be used to create a training set for other partitions of data items into different types.

A pair extractor 602 extracts query-URL pairs from a query log 604 produced by a search engine (not shown) or any other type of query-processing engine (not shown). Each query-URL pair corresponds to a query submitted by a user on a prior occasion, together with a Uniform Resource Locator (URL) of a document that the user clicked on or otherwise selected in response to submitting the query. The pair extractor 602 stores the query-URL pairs in a data tore 606.

A data extractor 608 then uses the URL of each query-URL pair to extract text content of the document associated with the URL. The data extractor 608 can perform this task by accessing the document from the data store(s) 110, and then scraping the text content from the document. For instance, the data store(s) 110 may represent computer-implemented data stores accessible via a wide area network, such as the Internet. As an outcome of its processing, the data extractor 608 stores a plurality of query-text pairs in a data store 610.

A domain identifier 612 identifies the subject matter domain associated with each document. For example, the domain identifier 612 can map the text content associated with the document to a domain classification that most likely represents the main topic associated with the text content. The domain identifier 612 can use any technology to perform this task. For example, the domain identifier 612 can use any machine-learned classification model to perform this task, including, but not limited to, a Convolutional Neural Network (CNN), a logistic regression classifier, a decision tree network, a Bayesian model, etc. In other cases, the domain identifier 612 can use a latent Dirichlet allocation (LDA) model to perform this task.

The domain identifier 612 can then use any grouping technique to identify a set of primary classifications associated with the documents. For example, assume that, as a result of its classification operation, the domain identifier 612 generates a classification value associated with each document that describes its most likely classification, e.g., corresponding to a float value, a vector, etc. The domain identifier 612 can use any classification algorithm (such as the k-means classification algorithm) to group the document classification values into a set of principal clusters. The domain identifier 612 can assign a domain identifier (ID) to each such cluster, corresponding to the classification associated with the cluster. Each document in a cluster is considered to inherit its cluster's domain ID. As a result of this processing, the domain identifier 612 produces a collection of tuples which it stores in a data store 614. Each tuple describes a query submitted by a user, the text associated with a document clicked on in response to submitting the query, and a domain ID associated with the document. The domain ID also describes the presumed subject matter of the query and each sentence in the document.

Figure 7:
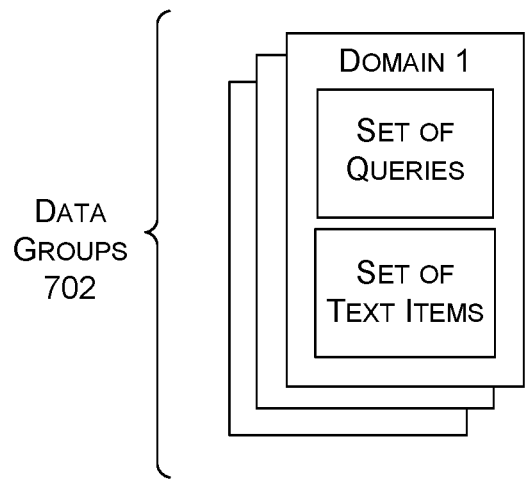
FIG. 7 shows data groups produced by the data set-creating tool of FIG. 6.

A data grouper 616 partitions data in the data store 614 to produce the training set shown in FIG. 7, stored in the data store 118. The training set includes a collection of groups 702. Each group corresponds to a particular subject matter domain, associated, in turn, with a particular domain ID. Each group also includes a set of queries and a set of text items associated with the domain. In one implementation, the data grouper 616 produces the text items in a data set by partitioning each document into its constituent sentences (and/or other units of text), which are all considered to share the domain ID of the document from which they originated.

Other implementations of the data grouper 616 can vary one or more aspects of its operation described above. For example, the data grouper 616 can alternatively identify the topic of each individual sentence in a document based on just the words in the individual sentence. The data grouper 616 can retain the sentence only if its classification is within a prescribed distance from the document's global classification, e.g., which can be assessed based on any metric (such as cosine similarity, etc.).

Figure 8:
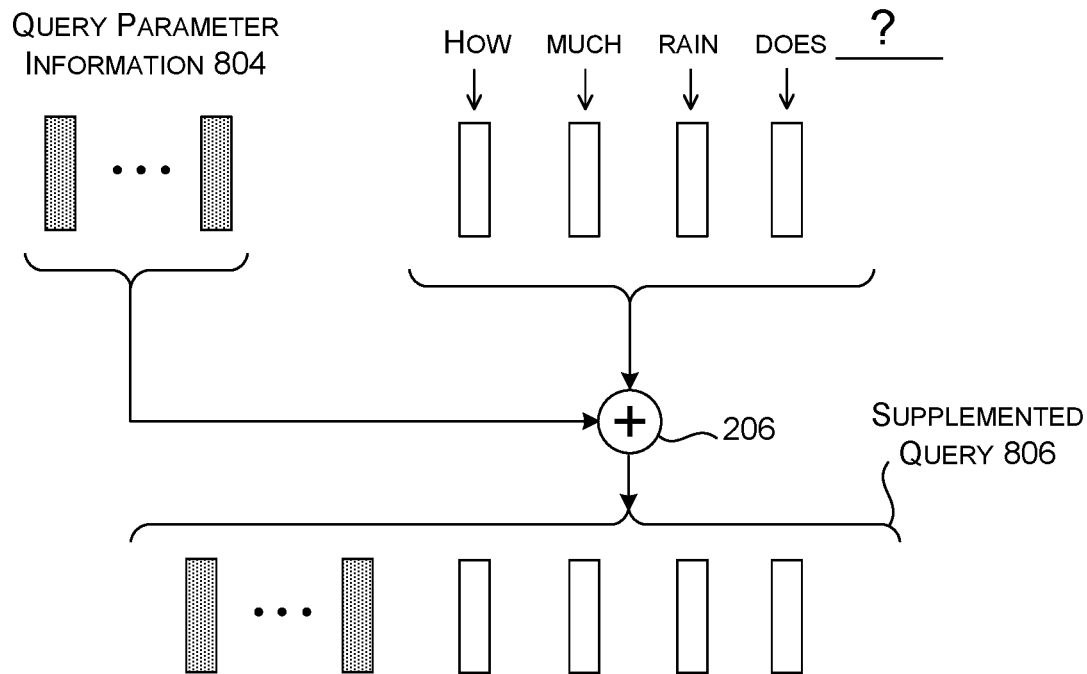
FIG. 8 shows an example of how the training system of FIG. 1 can supplement a query with query parameter information.

FIG. 8 provides further details regarding the operation of the training system 102 for the case in which query 802 is processed. For example, assume that the query corresponds to a question submitted by a user and stored in the query log 604. The training system 102 can first represent the parts of the query 802 as a series of tokens. The tokens may represent respective words in the query or fragments of words (e.g., n-grams, etc.). The training system 102 then converts each token into a respective vector having a prescribed dimension using any technology, such as a lookup table, a machine-learned model, etc. The training system 102 likewise represents the query parameter information 804 as one or more vectors, such as five vectors in one non-limiting case. More generally, the number of vectors used to express the query parameter information is a configurable setting. The parameter-bearing vector(s) have the same dimensionality as the word vector(s). The parameter-combining component 206 then concatenates the vectors that express the query parameter information 804 with the vectors that express the query 802, to produce a supplemented query 806. As noted above, other implementations can combine parameter information with a data item in other respective ways.

Figure 9:
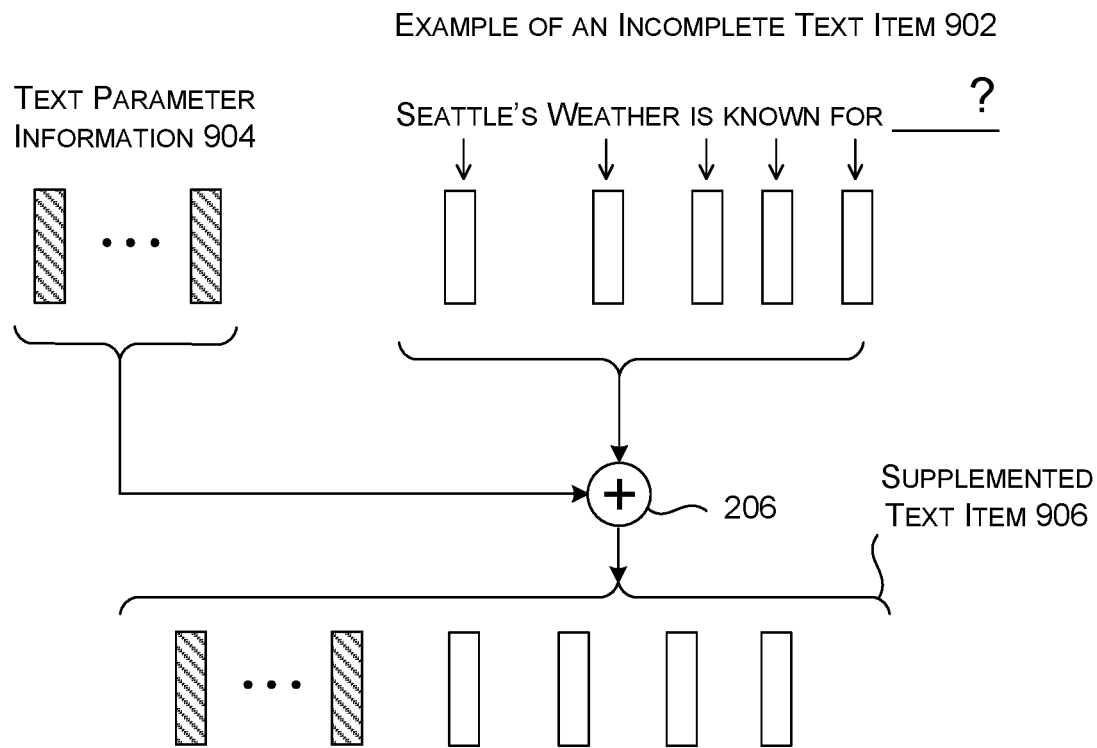
FIG. 9 shows an example of how the training system of FIG. 1 can supplement a text item with type parameter information.

FIG. 9 provides further details regarding the operation of the training system 102 for the case in which a text item 902 is processed. For example, assume that the text item 902 corresponds to a sentence or part of a sentence extracted from a document. The training system 102 can first represent the parts of the text item 902 as a series of vectors in the same manner described above for FIG. 8. The training system 102 likewise represents the text parameter information 904 as one or more vectors, such as a sequence of five vectors in one non-limiting case, each having the same dimensionality as the word vector(s). The parameter-combining component 206 then concatenates the vectors that express the text parameter information 904 with the vectors that express the text item 902, to produce a supplemented text item 906. As noted above, other implementations can combine parameter information with a data item in other respective ways.

Figure 10:
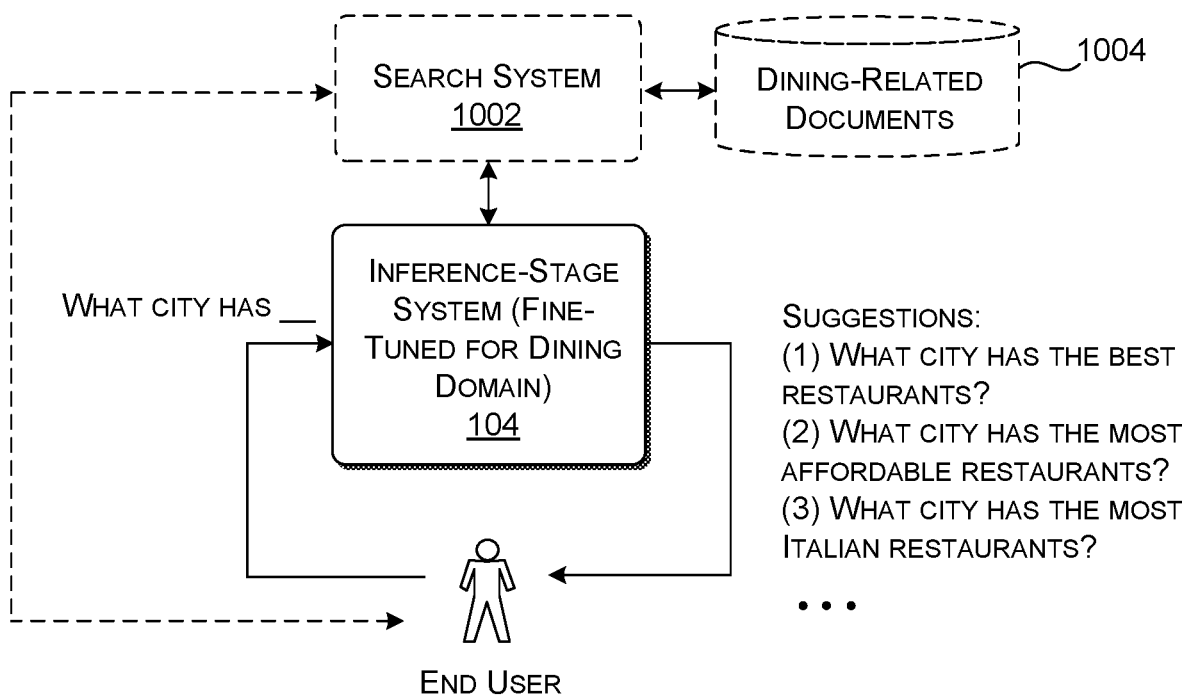
FIG. 10 shows an example of the operation of a query-suggestion model produced by the training system of FIG. 1.

FIG. 10 shows an example of the operation of the inference-stage system 104. Assume that the inference-stage system 104 has been trained to process queries directed to a new domain associated with the topic of dining. Further assume that the inference-stage system 104 receives a question or part of a question that reads: "What city has". The inference-stage system 104 can generate one or more query suggestions in response to the input query, such as the top-ranked suggestion that reads: "What city has the best restaurants?"

A separate search system 1002 can perform a search based on any query submitted by a user. In some implementations, the search system 1002 can conduct its search within a corpus of domain-specific documents relating to the topic of dining, which are stored in one or more data stores 1004, and which are searchable using an index (not shown). One way that a user can submit a query is by performing an "enter" command after submitting a query. Another way that a user may submit a search is by clicking on a query suggestion generated by the inference-stage system 104.

Figure 11:
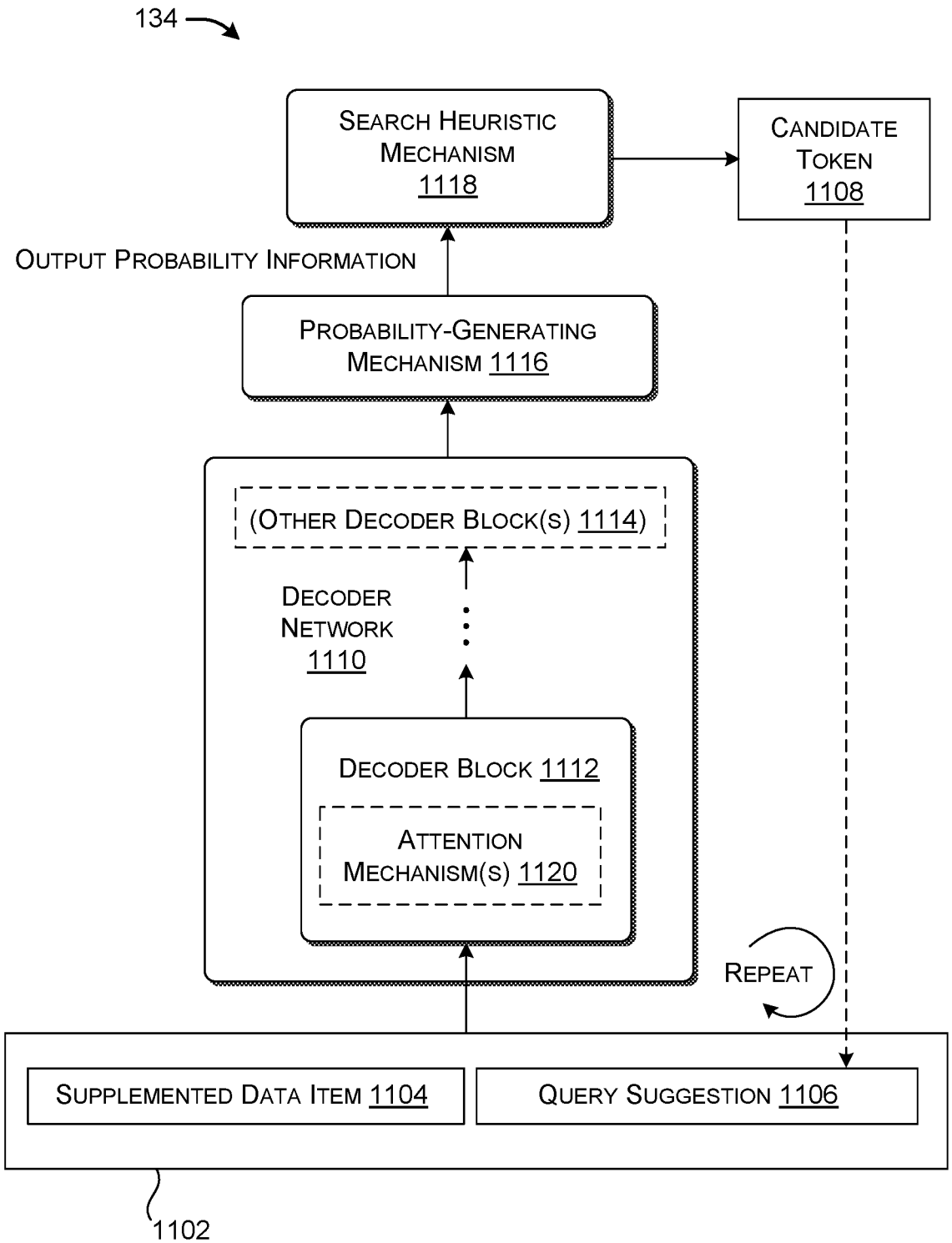
FIG. 11 shows an example of a type of a mapping network that the inference-stage system of FIG. 1 can use to map an input data item into an output data item.

FIG. 11 shows one implementation of the mapping network 134. FIG. 11 specifically is explained in the context of the inference-stage system 104, which uses the mapping network 134 to map an input data item to an output data item. Here, the input item derives from an input query submitted by a user. Although not shown in FIG. 1 or 11, the training tool 106 also applies a mapping network to map input data items to respective output data items. In that context, an input data item may correspond to a query or a text item.

Different implementations can use different kinds of models to implement the mapping network 134. FIG. 11 shows one non-limiting example in which the mapping network 134 uses a transformer-based standalone decoder to autoregressively generate the output data item, given the input data item. That is, the mapping network 134 accepts input information 1102 that includes a supplemented data item 1104 and a generated query suggestion 1106 (which, at the beginning of processing, is empty). The supplemented data item 1104 includes query parameter information prepended to a submitted query. The mapping network 134 maps that input information 1102 to an output token 1108. The output token 1108 corresponds to a next (or first) word in the query suggestion 1106. In a next iteration, the mapping network 134 adds the output token 1108 to the query suggestion 1106 to produce updated input information 1102. The mapping network 134 then processes the updated input information 1102 to generate a next token. This process is repeated until the mapping network 134 generates an end-of-sequence token, signaling that the query suggestion 1106 is now complete. (In some implementations, the full query suggestion may include a combination of an original data item supplied by the user and the generated token(s).)

Although not shown, the mapping network 134 can include any input-encoding mechanism for converting the tokens in the input information 1102 into respective input vectors (if not already in an appropriate vector form). The encoding mechanism can also add position information to the input vector that describes the respective positions of the tokens in the input information 1102, e.g., by adding position information to a second word to indicate that it is second in the sequence of words, etc. A decoder network 1110 uses one or more decoder blocks (such as representative decoder block 1112 and other decoder block(s) 1114) to convert the input vectors into decoder output information. A probability-generating mechanism 1116 converts the decoder output information into a probability distribution. The probability distribution provides probabilities associated with tokens in a vocabulary. Each probability identifies the likelihood that an associated token (e.g., a particular word) represents the next token in the query suggestion 1106. In some implementations, the probability-generating mechanism 1116 includes one or more neural network layers followed by a softmax operation (that is, a normalized exponential function).

A search heuristic mechanism 1118 then applies a search heuristic to select one or more next tokens based on the probabilities. In the simplified example of FIG. 11, the search heuristic mechanism 1118 applies a greedy selection algorithm to select the single output token 1108 that has the highest probability. As noted above, the mapping network 134 then appends this output token 1108 to the end of the query suggestion 1106, upon which it repeats the above process to generate a next token.

In other implementations (not shown), the mapping network 134 produces plural query suggestions for each supplemented data item 1104. The search heuristic mechanism 1118 can achieve this result by, at each stage in generating the suggestions, using a beam search algorithm to generate plural candidate tokens (not shown), corresponding to those candidate tokens having the highest conditional probabilities. The mapping network 134 updates plural instances of input information (not shown) based the plural identified candidate tokens, and repeats the above-described process for each instance of input information.

Each decoder block can include an attention mechanism. For instance, the first decoder block 1112 includes a representative attention mechanism 1120. In one implementation, the attention mechanism 1120 of the first decoder block 1112 generates attention information using the following equation:

$$attn(Q, K, V) = \text{softmax}\left(\frac{QK^T}{\sqrt{d}}\right)V. \quad (1)$$

In this case, the query information Q is produced by multiplying a last-introduced token of the input information 1102 by a query weighting matrix $W^Q$. Key information K and value information V are produced by multiplying the vectors associated with the input information 1102 as a whole by a key weighting matrix $W^K$ and a value weighting matrix $W^V$, respectively. Equation (1) involves taking the dot product of Q by the transpose of K, and then dividing that dot product by a scaling factor $\sqrt{d}$, where d may represent the dimensionality of the machine-learned model. This yields a scaled result. Equation (1) then involves computing the softmax of the scaled result, and then multiplying the result of the softmax operation by V.

Each subsequent decoder block in the decoder network 1110 operates in the same manner as the first decoder block 1112. However, each subsequent decoder block builds the query information Q, key information K, and value information V based on the output of a preceding decoder block.

Figure 12:
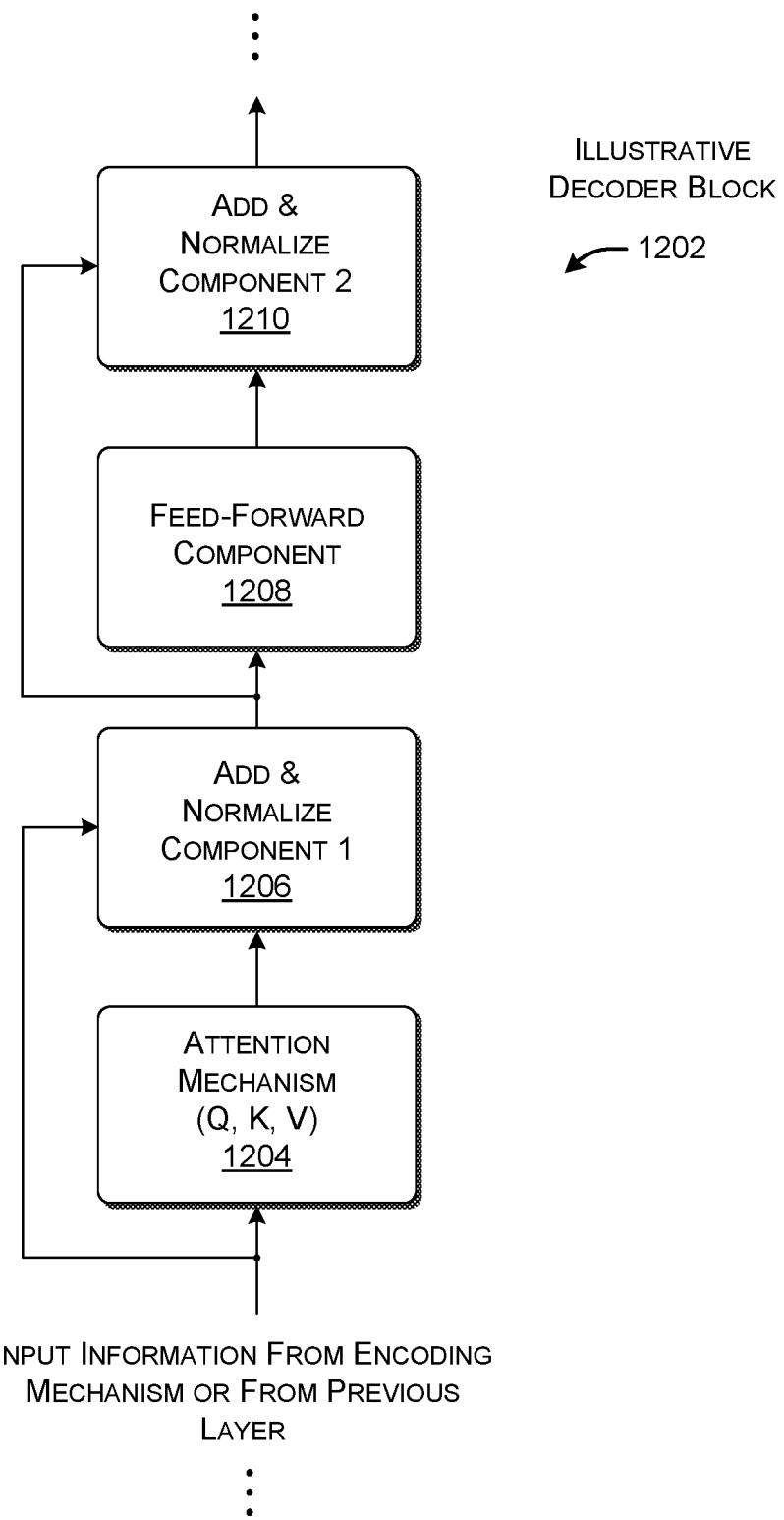
FIG. 12 shows one implementation of a decoder block for use in the mapping network of FIG. 11.

FIG. 12 shows one implementation each decoder block 1202 of the decoder network 1110 of FIG. 11. Generally, the decoder network 1110 may include a pipeline of the kind of decoder block 1202 shown in FIG. 12, with the output of one decoder block serving as input information to a subsequent decoder block.

In some non-limiting implementations, the decoder block 1202 includes an attention mechanism 1204, an add-&-normalize component 1206, a feed-forward component 1208, and another add-&-normalize component 1210. The attention mechanism 1204 performs attention (e.g., self-attention, cross-attention, etc.) in any manner, such as by using the transformations described in Equation (1). The first add-&-normalize component 1206 adds the input information fed to the attention mechanism 1204 to the output information provided by the attention mechanism 1204 (thus forming a residual connection), and then performs layer-normalization on that result. Layer normalization entails adjusting values in a layer based on the mean and deviation of those values in the layer. The feed-forward component 1208 uses one or more fully connected neural network layers to map input information to output information. The second add-&-normalize component 1210 performs the same function as the first add-&-normalize component 1206.

The specific type of mapping network 134 shown in FIGS. 11 and 12 is set forth here in the spirit of illustration, not limitation. Other implementations of the mapping network 134 can use other machine-learned models to generate output text. For example, another implementation of the mapping network 134 can use a sequence-processing neural network, such as a recurrent neural network (RNN), to perform this task. Each unit of the RNN can be implemented, for example, as a long short-term memory unit (LSTM). Another implementation of the mapping network 134 can generate a vector that describes an input item, and can then use a search algorithm (such as the approximate nearest neighbor algorithm) to select a pre-generated output item having a most-closely matching vector. A data store can store the pre-generated output items, and an index can store these output items' pre-generated vectors. Still other implementations are possible.

More generally, the above characteristics of the training system 102 and inference-stage system 104 can be varied in additional ways. For example, the training system 102 can use the principles described above to generate a classification model. In some implementations, the classification model can classify an instance of input text, such as by assessing the sentiment expressed by the input text. Here, the creating tool 116 can form a training set that identifies different types of data items. For instance, the creating tool 116 can scrape first-type items from explicit online reviews, e.g., as expressed in a movie database website. The creating tool 116 can scrape second-type items from more informal blogs that mention products, and so on. The machine-learned classification model can map vectors associated with a supplemented data item to an output score that reflects a sentiment. Still other types of machine-learned models can benefit from the training approach described above.

B. Illustrative Processes

FIGS. 13-18 show processes that explain the operation of the training system 102 and inference-stage system 104 of Section A in flowchart form. Since the principles underlying the operation of these systems (102, 104) have already been described in Section A, certain operations will be addressed in summary fashion in this section. Each flowchart is expressed as a series of operations performed in a particular order. But the order of these operations is merely representative, and can be varied in other implementations. Further, any two or more operations described below can be performed in a parallel manner. In one implementation, the blocks shown in the flowcharts that pertain to processing-related functions can be implemented by the hardware logic circuitry described in Section C, which, in turn, can be implemented by one or more hardware processors and/or other logic units that include a task-specific collection of logic gates.

Figure 14:
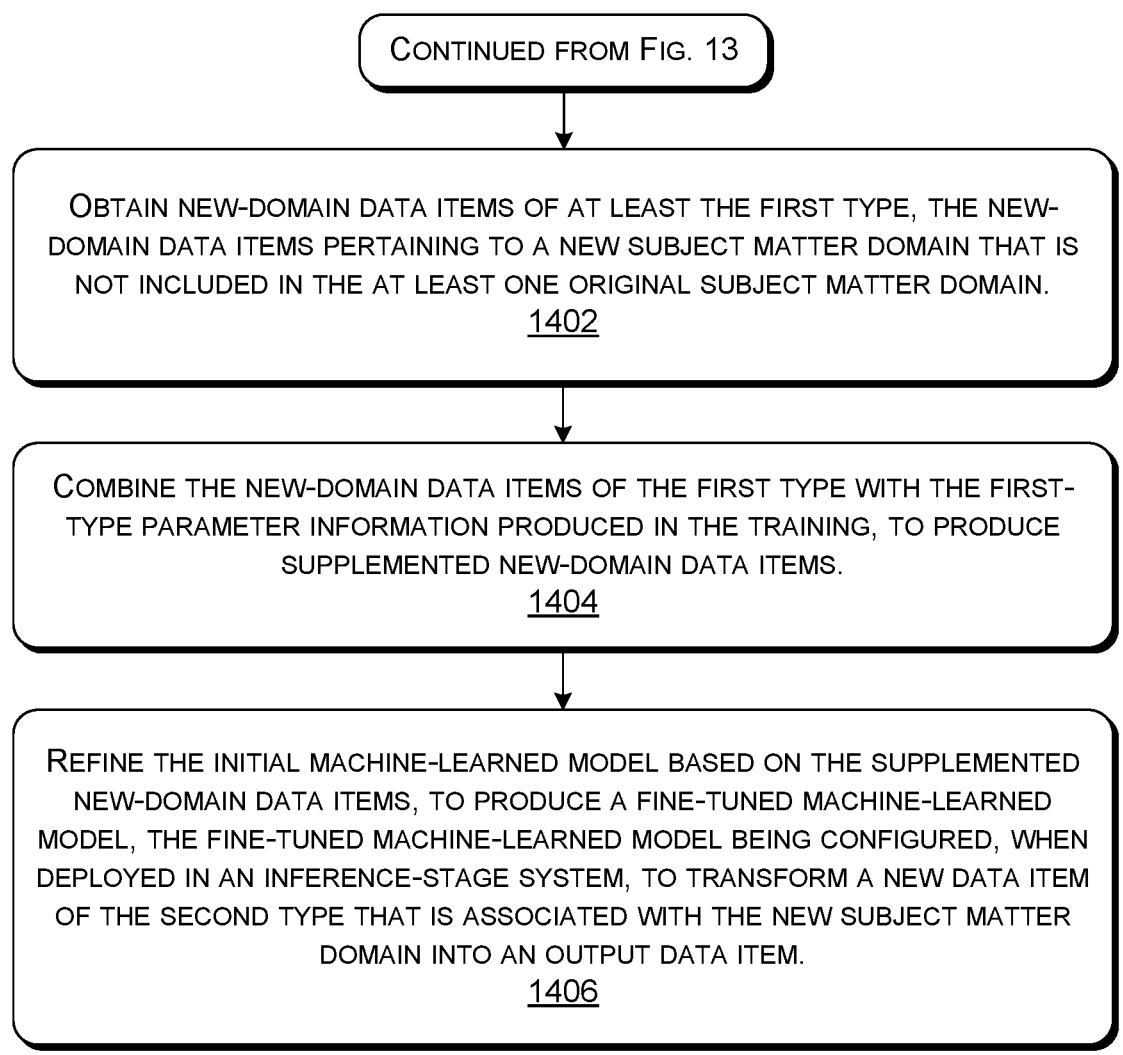

More specifically, FIGS. 13 and 14 together show a process 1302 that represents an overview of one manner of operation of the training system 102 of FIG. 1. In block 1304, the training system 102 obtains first-type data items that pertain to a first type of data items. In block 1306, the training system 102 obtains second-type data items that pertain to a second type of data items, the second type differing from the first type. The first-type data items and the second-type data items pertain to at least one original subject matter domain. In block 1308, the training system 102 combines the first-type data items with first-type parameter information that pertains to the first type, to produce first-type supplemented data items. In block 1310, the training system 102 combines the second-type data items with second-type parameter information that pertains to the second type, to produce second-type supplemented data items. In block 1312, the training system 102 trains an initial machine-learned model 108 based on the plurality of first-type supplemented data items and the plurality of second-type supplemented data items, the training also resulting in training the first-type parameter information and the second-type parameter information.

In block 1402 of FIG. 14, the training system 102 obtains new-domain data items of at least the first type, the new-domain data items pertaining to a new subject matter domain 120. That is, the new subject matter domain 120 is new because it is not one of the original subject matter domains. In block 1404, the training system 102 combines the new-domain data items of the first type with the first-type parameter information produced in the training, to produce supplemented new-domain data items. In block 1406, the training system 102 refines the initial machine-learned model 108 based on the supplemented new-domain data items, to produce a fine-tuned machine-learned model 112. The fine-tuned machine-learned model 112 is configured, when deployed in an inference-stage system 104, to transform a new data item of the second type that is associated with the new subject matter domain 120 into an output data item.

In some implementations, there is at least a prescribed number of second-type data items for each original subject matter domain, and the fine-tuned machine-learned model 112 is trained on a number of second-type data items pertaining to the new subject matter domain 120 that is less than the prescribed number. More specifically, the fine-tuned machine-learned model 112 may have been trained on no new-domain data items of the second type. In other cases, the fine-tuned machine-learned model 112 may have been trained on some new-domain data items of the second type, but this number is less than the prescribed number of second-type data items that were used to train the initial machine-learned model 108, for each of the original subject matter domains. For example, assume that the initial machine-learned model 108 is trained on a set of at least three hundred thousand queries for each original subject matter domain. In some cases, the fine-tuned machine-learned model 112 may be trained on zero queries pertaining to the new subject matter domain 120. In other cases, the fine-tuned machine-learned model 112 may be trained on just one thousand queries pertaining to the new subject matter domain 120. In some environments, a set one thousand queries would be insufficient by itself, without the use of the trained parameter information described in Section A, to meet prescribed performance goals with respect to the processing of new queries pertaining to the new subject matter domain 120. The training tool 106 is particularly useful for those cases in which there is an expectation that there will be a scarcity of new-domain second-type data items, e.g., where "scarcity" may be defined based on the criteria set forth above. But a developer can also use the above-described training process 1302 even when sufficiently large data sets are expected to be available for future domains, e.g., where "sufficiently large" can be gauged based on the criteria set forth above. The training process 1302 is advantageous in this latter situation because it can potentially achieve target performance goals in less time, compared to an alternative technique that does not use trainable parameter information.

Figure 15:
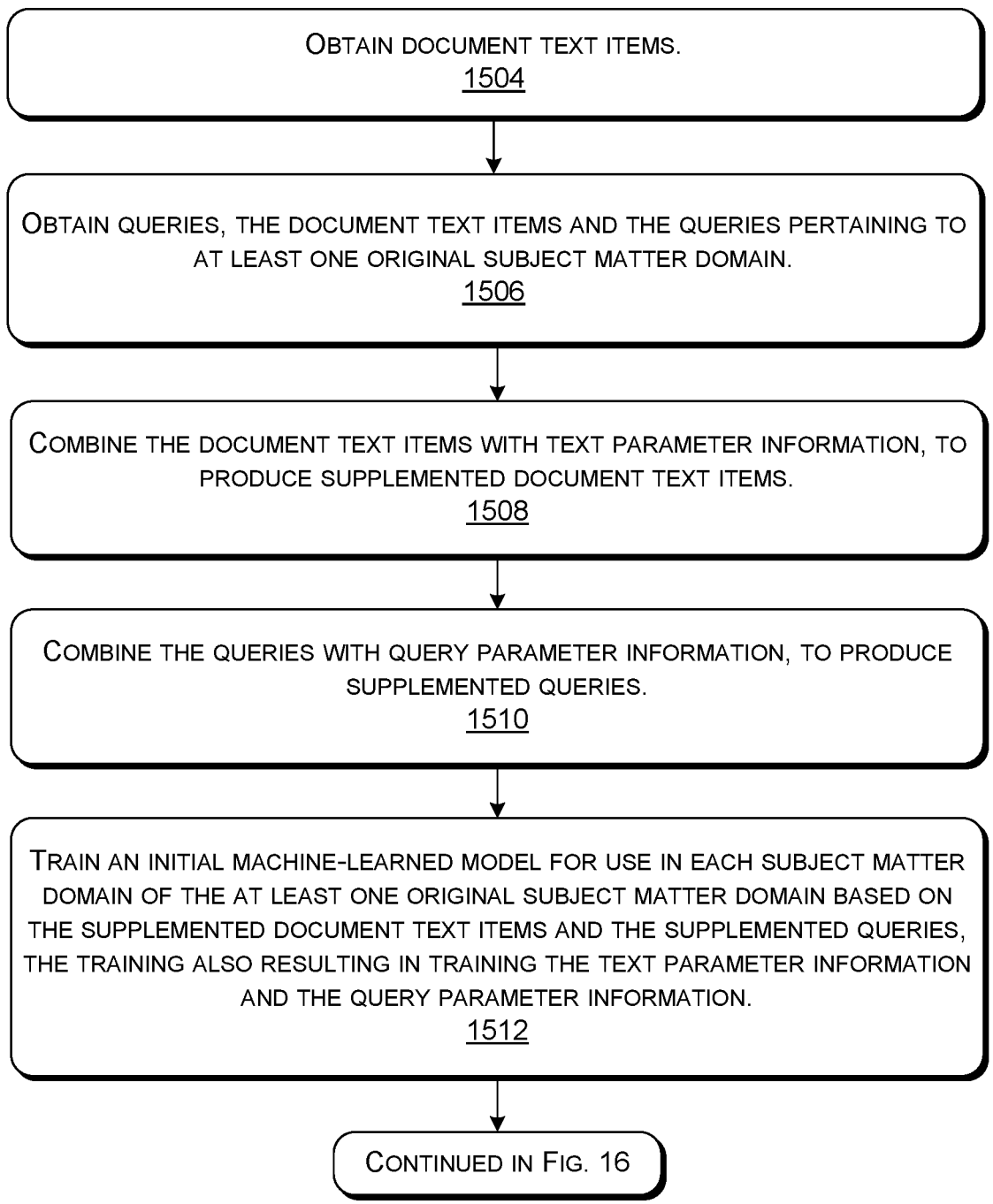
FIGS. 15 and 16 together show a process that represents one particular implementation of the process of FIGS. 13 and 14.
Figure 16:
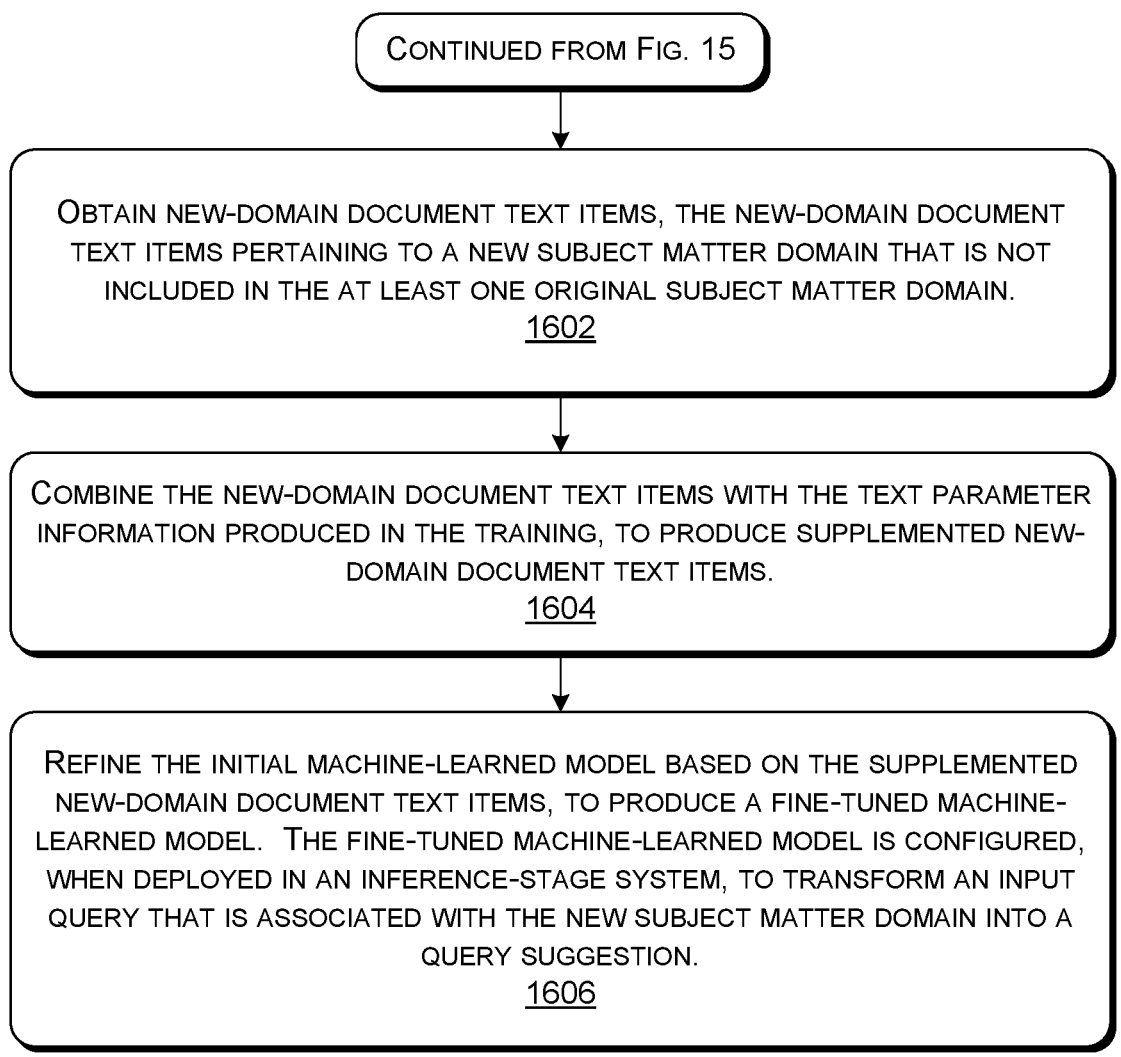

FIGS. 15 and 16 together show a process 1502 that represents one particular implementation of the process 1302 of FIGS. 13 and 14. In block 1504, the training system 102 obtains document text items. In block 1506, the training system 102 obtains queries. The document text items and the queries pertain to at least one original subject matter domain. In block 1508, the training system 102 combines the document text items with text parameter information, to produce supplemented document text items. In block 1510, the training system 102 combines the queries with query parameter information, to produce supplemented queries. In block 1512, the training system 102 trains an initial machine-learned model 108 for use in each subject matter domain of the at least one original subject matter domain based on the supplemented document text items and the supplemented queries, the training also resulting in training the text parameter information and the query parameter information.

In block 1602 of FIG. 16, the training system 102 obtains new-domain document text items, the new-domain document text items pertaining to a new subject matter domain 120 that is not included in the at least one original subject matter domain. In block 1604, the training system 102 combines the new-domain document text items with the text parameter information produced in the prior training operation (that was used to produce the initial model 108), to produce supplemented new-domain document text items. In block 1606, the training system 102 refines the initial machine-learned model 108 based on the supplemented new-domain document text items, to produce a fine-tuned machine-learned model 112. The fine-tuned machine-learned model 112 is configured, when deployed in an inference-stage system 104, to transform an input query that is associated with the new subject matter domain 120 into a query suggestion.

In some implementations, there is at least a prescribed number of queries for each original subject matter domain, and the fine-tuned machine-learned model 112 is trained on a number of queries pertaining to the new subject matter domain that is less than the prescribed number of queries.

FIG. 17 shows a process 1702 that represents an overview of one manner of operation of the inference-stage system 104 of FIG. 1. In one implementation, the process 1702 is implemented by a neural network 126 that has been trained in a preceding training process on data items of different types, including at least a first type and a second type, the second type differing from the first type. In block 1704, the inference-stage system 104 inputs a new data item of the second type. In block 1706, the inference-stage system 104 combines the new data item with second-type parameter information that has been trained in the preceding training process, to produce a supplemented new data item. In block 1708, the inference-stage system 104 maps the supplemented new data item to an output data item based on model weights that have also been trained in the preceding training process.

The preceding training process involves, in block 1708-1, training an initial machine-learned model 108 based on first-type supplemented data items that pertain to the first type, and based on second-type supplemented data items that pertain the second type. The first-type supplemented data items and the second-type supplemented data items pertain to at least one original subject matter domain. The first-type supplemented data items are produced by combining respective first-type data items with first-type parameter information, and the second-type supplemented data items are produced by combining respective second-type data items with the second-type parameter information. In block 1708-2, the preceding training process then refines the initial machine-learned model 108 based on supplemented new-domain data items to produce a fine-tuned machine-learned model 112. The supplemented new-domain data items pertain to a new subject matter domain 120 that is not included in the at least one original subject matter domain. The mapping operation (1708) uses the fine-tuned machine-learned model 112 to produce the output data item.

Figure 18:
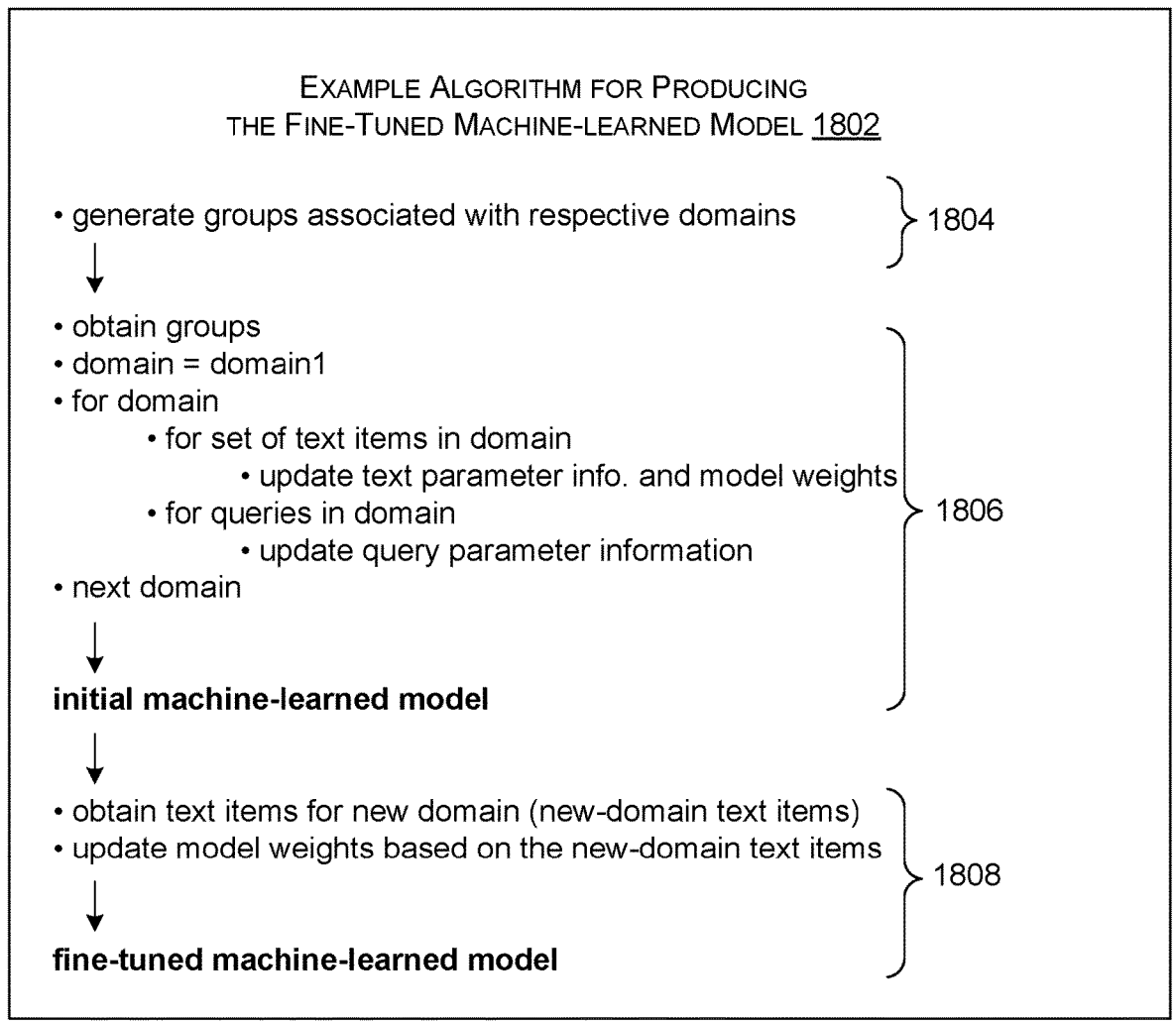
FIG. 18 shows an illustrative algorithm that explains one manner of operation of the training system of FIG. 1.

FIG. 18 shows an example of a procedure 1802 for generating a fine-tuned model. In part 1804, the training system 102 generates the training set. In part 1806, the training system 102 generates the initial model 108 based on the training set. It performs this task by processing the domains in the training set, one after the other. Within each domain, the training system 102 processes the text data set followed by the query data set. In part 1808, the training system 102 refines the initial model 108 based on new-domain data items, to produce the fine-tuned model 112.

C. Representative Computing Functionality

Figure 19:
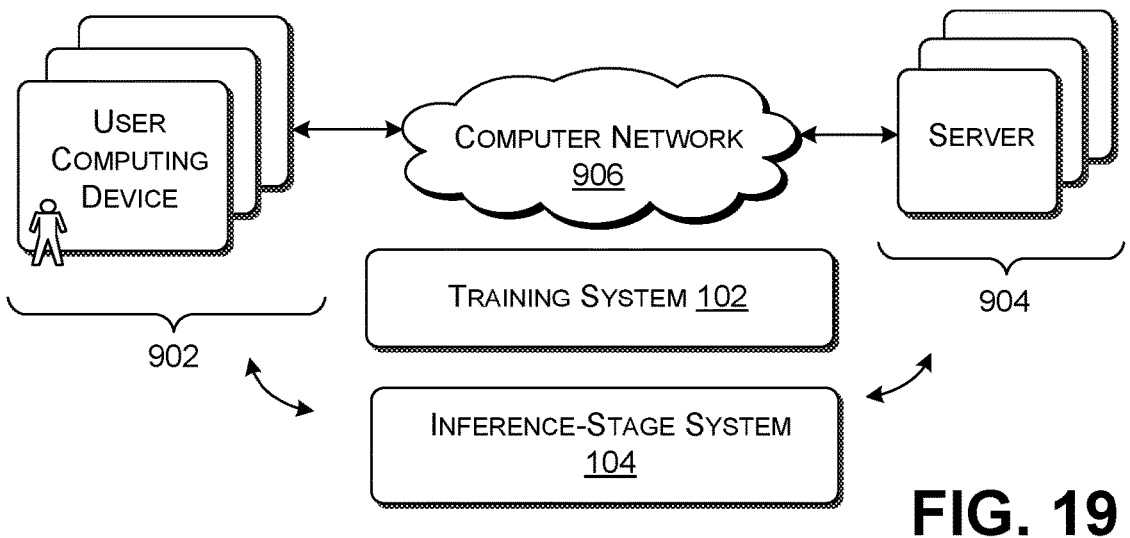
FIG. 19 shows computing equipment that can be used to implement the systems shown in FIG. 1.

FIG. 19 shows an example of computing equipment that can be used to implement any of the systems described above. The computing equipment includes a set of user computing devices 1902 coupled to a set of servers 1904 via a computer network 1906. Each user computing device can correspond to any device that performs a computing function, including a desktop computing device, a laptop computing device, a handheld computing device of any type (e.g., a smartphone, a tablet-type computing device, etc.), a mixed reality device, a wearable computing device, an Internet-of-Things (IoT) device, a gaming system, and so on. The computer network 1906 can be implemented as a local area network, a wide area network (e.g., the Internet), one or more point-to-point links, or any combination thereof.

FIG. 19 also indicates that the training system 102 and the inference-stage system 104 can be spread across the user computing devices 1902 and/or the servers 1904 in any manner. For instance, in one case, the inference-stage system 104 is entirely implemented by one or more of the servers 1904. Each user may interact with the servers 1904 via a browser application or other programmatic interface provided by a user computing device. In another case, the inference-stage system 104 is entirely implemented by a user computing device in local fashion, in which case no interaction with the servers 1904 is necessary. In another case, the functionality associated with the inference-stage system 104 is distributed between the servers 1904 and each user computing device in any manner.

Figure 20:
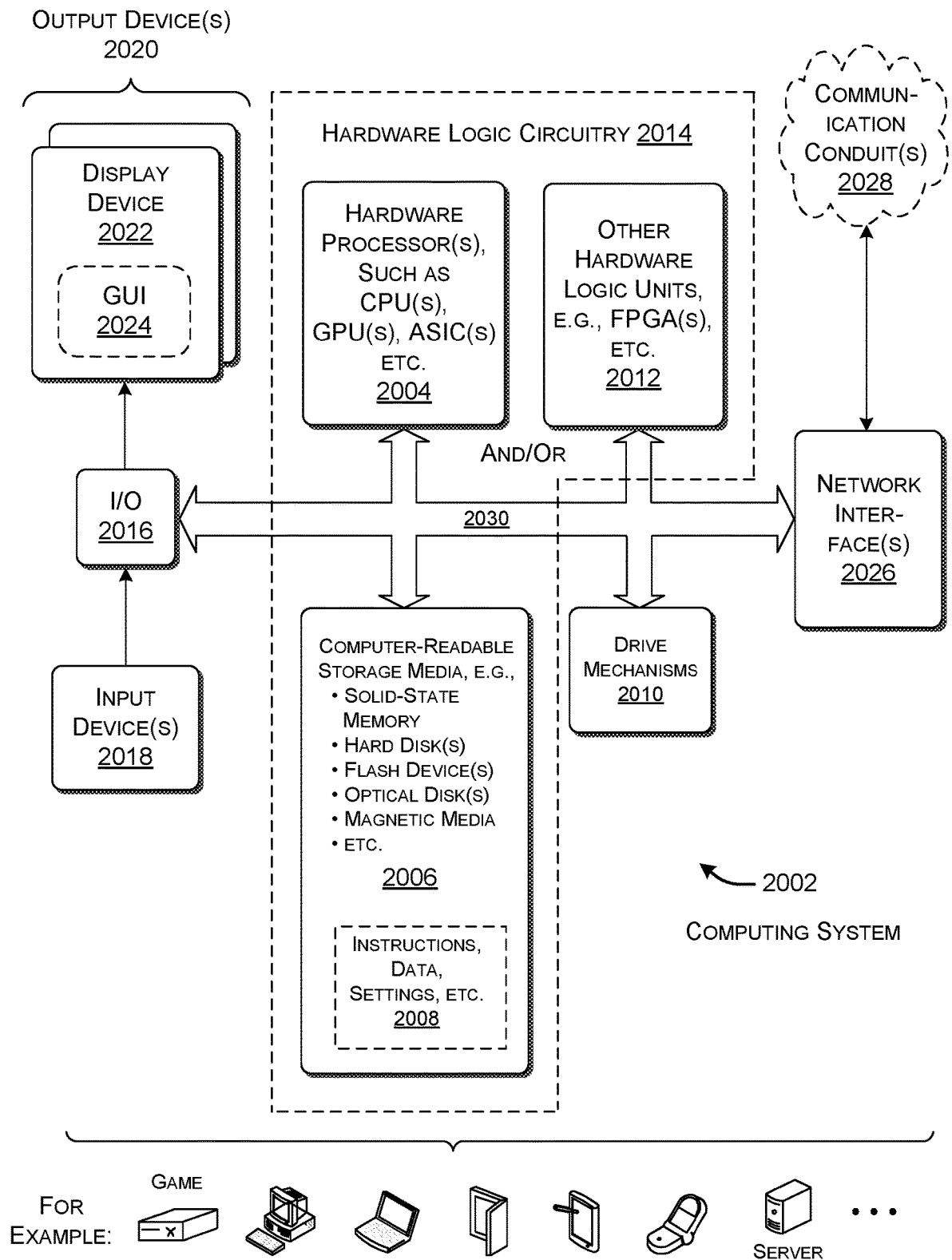
FIG. 20 shows an illustrative type of computing system that can be used to implement any aspect of the features shown in the foregoing drawings.

FIG. 20 shows a computing system 2002 that can be used to implement any aspect of the mechanisms set forth in the above-described figures. For instance, the type of computing system 2002 shown in FIG. 20 can be used to implement any user computing device or any server shown in FIG. 19. In all cases, the computing system 2002 represents a physical and tangible processing mechanism.

The computing system 2002 can include one or more hardware processors 2004. The hardware processor(s) 2004 can include, without limitation, one or more Central Processing Units (CPUs), and/or one or more Graphics Processing Units (GPUs), and/or one or more Application Specific Integrated Circuits (ASICs), and/or Neural Processing Units (NPU), etc. More generally, any hardware processor can correspond to a general-purpose processing unit or an application-specific processor unit.

The computing system 2002 can also include computer-readable storage media 2006, corresponding to one or more computer-readable media hardware units. The computer-readable storage media 2006 retains any kind of information 2008, such as machine-readable instructions, settings, data, etc. Without limitation, the computer-readable storage media 2006 may include one or more solid-state devices, one or more magnetic hard disks, one or more optical disks, magnetic tape, and so on. Any instance of the computer-readable storage media 2006 can use any technology for storing and retrieving information. Further, any instance of the computer-readable storage media 2006 may represent a fixed or removable unit of the computing system 2002. Further, any instance of the computer-readable storage media 2006 may provide volatile or non-volatile retention of information.

More generally, any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se in transit, while including all other forms of computer-readable media. In this sense, a "computer-readable storage medium" can be said to be a non-transitory storage medium.

The computing system 2002 can utilize any instance of the computer-readable storage media 2006 in different ways. For example, any instance of the computer-readable storage media 2006 may represent a hardware memory unit (such as Random Access Memory (RAM)) for storing transient information during execution of a program by the computing system 2002, and/or a hardware storage unit (such as a hard disk) for retaining/archiving information on a more permanent basis. In the latter case, the computing system 2002 also includes one or more drive mechanisms 2010 (such as a hard drive mechanism) for storing and retrieving information from an instance of the computer-readable storage media 2006.

The computing system 2002 may perform any of the functions described above when the hardware processor(s) 2004 carry out computer-readable instructions stored in any instance of the computer-readable storage media 2006. For instance, the computing system 2002 may carry out computer-readable instructions to perform each block of the processes described in Section B.

Alternatively, or in addition, the computing system 2002 may rely on one or more other hardware logic units 2012 to perform operations using a task-specific collection of logic gates. For instance, the hardware logic unit(s) 2012 may include a fixed configuration of hardware logic gates, e.g., that are created and set at the time of manufacture, and thereafter unalterable. Alternatively, or in addition, the other hardware logic unit(s) 2012 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 20 generally indicates that hardware logic circuitry 2014 includes any combination of the hardware processor(s) 2004, the computer-readable storage media 2006, and/or the other hardware logic unit(s) 2012. That is, the computing system 2002 can employ any combination of the hardware processor(s) 2004 that execute machine-readable instructions provided in the computer-readable storage media 2006, and/or one or more other hardware logic unit(s) 2012 that perform operations using a fixed and/or programmable collection of hardware logic gates. More generally stated, the hardware logic circuitry 2014 corresponds to one or more hardware logic units of any type(s) that perform operations based on logic stored in and/or otherwise embodied in the hardware logic unit(s). Further, in some contexts, each of the terms "component," "module," "engine," "system," "mechanism," "tool," etc. refers to a part of the hardware logic circuitry 2014 that performs a particular function or combination of functions.

In some cases (e.g., in the case in which the computing system 2002 represents a user computing device), the computing system 2002 also includes an input/output interface 2016 for receiving various inputs (via input devices 2018), and for providing various outputs (via output devices 2020). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers, gyroscopes, etc.), and so on. One particular output mechanism may include a display device 2022 and an associated graphical user interface presentation (GUI) 2024. The display device 2022 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing system 2002 can also include one or more network interfaces 2026 for exchanging data with other devices via one or more communication conduits 2028. One or more communication buses 2030 communicatively couple the above-described units together.

The communication conduit(s) 2028 can be implemented in any manner, e.g., by a local area computer network, a wide area computer network (e.g., the Internet), point-to-point connections, etc., or any combination thereof. The communication conduit(s) 2028 can include any combination of hardwired links, wireless links, routers, gateway functionality, name servers, etc., governed by any protocol or combination of protocols.

FIG. 20 shows the computing system 2002 as being composed of a discrete collection of separate units. In some cases, the collection of units corresponds to discrete hardware units provided in a computing device chassis having any form factor. FIG. 20 shows illustrative form factors in its bottom portion. In other cases, the computing system 2002 can include a hardware logic unit that integrates the functions of two or more of the units shown in FIG. 1. For instance, the computing system 2002 can include a system on a chip (SoC or SOC), corresponding to an integrated circuit that combines the functions of two or more of the units shown in FIG. 20.

The following summary provides a non-exhaustive set of illustrative examples of the technology set forth herein.

(A1) According to a first aspect, some implementations of the technology described herein include a computer-implemented method (e.g., the process 1302 of FIGS. 13 and 14) for performing machine-learning. The method includes obtaining (e.g., in block 1304) first-type data items that pertain to a first type of data items, and obtaining (e.g., in block 1306) second-type data items that pertain to a second type of data items, the second type differing from the first type. The first-type data items and the second-type data items pertain to at least one original subject matter domain. The method further includes combining (e.g., in block 1308) the first-type data items with first-type parameter information that pertains to the first type, to produce first-type supplemented data items, and combining (e.g., in block 1310) the second-type data items with second-type parameter information that pertains to the second type, to produce second-type supplemented data items. The method further includes training (e.g., in block 1312) an initial machine-learned model (e.g., the initial model 108) for use in each subject matter domain of the at least one original subject matter domain based on the plurality of first-type supplemented data items and the plurality of second-type supplemented data items, the training also resulting in training the first-type parameter information and the second-type parameter information.

The first aspect also involves obtaining (e.g., in block 1402 of FIG. 14) new-domain data items of at least the first type, the new-domain data items pertaining to a new subject matter domain (e.g., the new domain 120) that is not included in the at least one original subject matter domain. The method further includes combining (e.g., in block 1404) the new-domain data items of the first type with the first-type parameter information produced in the training, to produce supplemented new-domain data items. The method further includes refining (e.g., in block 1406) the initial machine-learned model based on the supplemented new-domain data items, to produce a fine-tuned machine-learned model (e.g., the fine-tuned model 112). The fine-tuned machine-learned model is configured, when deployed in an inference-stage system (e.g., the inference-stage system 104), to transform a new data item of the second type that is associated with the new subject matter domain into an output data item.

According to one technical merit, the above-summarized method allows training to proceed in a data scarce environment, where it might otherwise be thwarted due to the lack of relevant training data. The method, by virtue of its use of trainable parameter information, also produces a refine-tuned model that meets defined performance goals in less time than other alternative techniques. The fine-tuned model itself offers better performance compared to some alternative models, again through its use of trainable parameter information.

(A2) According to some implementations of the method of A1, there is at least a prescribed number of second-type data items for each original subject matter domain. Further, the fine-tuned machine-learned model is trained on a number of second-type data items pertaining to the new subject matter domain that is less than the prescribed number.

(A3) According to some implementations of the method of A1 or A2, the first-type data items that are obtained correspond to document text items, each document text item having been extracted from a document. The second-type data items that are obtained correspond to queries submitted to an automated query-processing engine.

(A4) According to some implementations of any of the methods of A1-A3, the method generates groups associated with different respective original subject matter domains, each group including a set of first-type data items pertaining to a particular original subject matter domain and a set of second-type data items pertaining to the particular original subject matter domain. The training of the initial machine-learned model trains the initial machine-learned model by processing the groups one after another, and by processing sets within each group one after another.

(A5) According to some implementations of any of the methods of A1-A4, the training of the initial machine-learned model performs a first training process for the first-type data items and a second training process for the second-type data items.

(A6) According to some implementations of the method of A5, the first training process involves iteratively updating model weights of the initial machine-learned model, and iteratively updating the first-type parameter information.

(A7) According to some implementations of the method of A5, the second training process involves iteratively updating the second-type parameter information without updating model weights of the initial machine-learned model.

(A8) According to some implementations of any of the methods of A1-A7, the refining involves iteratively updating model weights of the initial machine-learned model without updating parameter information.

(A9) According to some implementations of any of the methods of A1-A8, the inference-stage system includes a neural network (e.g., the neural network 126) that is configured based on the fine-tuned machine-learned model.

(A10) According to some implementations of the method of A9, the neural network is a transformer-based decoder neural network that autoregressively maps input text into output text.

(A11) According to some implementations of any of the methods of claims A1-A10, the inference-stage system operates by: obtaining the new data item of the second type; combining the new data item of the second type with the second-type parameter information that has been trained by the training, to produce a supplemented new data item; and mapping the supplemented new data item to the output data item using the fine-tuned machine-learned data model.

(B1) According to another aspect, some implementations of the technology described herein include a computer-implemented method (e.g., the process 1502 of FIGS. 15 and 16) for performing machine-learning. The method includes obtaining document text items (e.g., in block 1504) and obtaining queries (e.g., in block 1506). The document text items and the queries pertain to at least one original subject matter domain. The method also includes combining (e.g., in block 1508) the document text items with text parameter information, to produce supplemented document text items, and combining (e.g., in block 1510) the queries with query parameter information, to produce supplemented queries. The method also includes training (e.g., in block 1512) an initial machine-learned model (e.g., the initial model 108) for use in each subject matter domain of the at least one original subject matter domain based on the supplemented document text items and the supplemented queries, the training also resulting in training the text parameter information and the query parameter information.

The method also includes obtaining (e.g., in block 1602 of FIG. 16) new-domain document text items, the new-domain document text items pertaining to a new subject matter domain (e.g., the new domain 120) that is not included in the at least one original subject matter domain. The method also includes combining (e.g., in block 1604) the new-domain document text items with the text parameter information produced in the training, to produce supplemented new-domain document text items. The method also includes refining (e.g., in block 1606) the initial machine-learned model based on the supplemented new-domain document text items, to produce a fine-tuned machine-learned model (e.g., the fine-tuned model 112). The fine-tuned machine-learned model is configured, when deployed in an inference-stage system (e.g., the inference-stage system 104), to transform an input query that is associated with the new subject matter domain into a query suggestion.

(C1) According to another aspect, some implementations of the technology described herein include a computer-implemented method (e.g., the process 1702 of FIG. 17) for performing inference using an inference-stage system (e.g., the inference-stage system 104). The inference-stage system includes a neural network (e.g., the neural network 126) that has been trained in a preceding training process on data items of different types, including at least a first type and a second type, the second type differing from the first type. The method includes inputting (e.g., in block 1704) a new data item of the second type, and combining (e.g., in block 1706) the new data item with second-type parameter information that has been trained in the preceding training process, to produce a supplemented new data item. The method also includes mapping (e.g., in block 1708) the supplemented new data item to an output data item based on model weights that have also been trained in the preceding training process.

The preceding training process involves training (e.g., in block 1708-1) an initial machine-learned model (e.g., the initial model 108) based on first-type supplemented data items that pertain to the first type, and based on second-type supplemented data items that pertain the second type. The first-type supplemented data items and the second-type supplemented data items pertain to at least one original subject matter domain. The first-type supplemented data items are produced by combining respective first-type data items with first-type parameter information, and the second-type supplemented data items are produced by combining respective second-type data items with the second-type parameter information. The preceding training process also involves refining (e.g., in block 1708-2) the initial machine-learned model based on supplemented new-domain data items to produce a fine-tuned machine-learned model (e.g., the fine-tuned machine-learned model 112). The supplemented new-domain data items pertain to a new subject matter domain that is not included in the at least one original subject matter domain. The mapping operation (in block 1708) uses the fine-tuned machine-learned model to produce the output data item.

In yet another aspect, some implementations of the technology described herein include a computing system (e.g., the computing system 2002) having hardware logic circuitry (e.g., the hardware logic circuitry 2014) that is configured to perform any of the methods described herein (e.g., any of the methods A1-A11, B1, or C1). In some implementations, the hardware logic circuitry implements a neural network (e.g., the neural network 126).

In yet another aspect, some implementations of the technology described herein include a computer-readable storage medium for storing computer-readable instructions. The computer-readable instructions, when executed by one or more hardware processors (e.g., the hardware processors 2004), perform any of the methods described herein (e.g., any of the methods A1-A11, B1, or C1)).

More generally stated, any of the individual aspects described herein can be combined, without limitation, into any logically consistent permutation or subset. Further, any such combination can be manifested, without limitation, as a method, device, system, computer-readable storage medium, data structure, article of manufacture, graphical user interface presentation, etc. The technology can also be expressed as a series of means-plus-format elements in the claims, although this format should not be considered to be invoked unless the phase "means for" is explicitly used in the claims.

As to terminology used in this description, the phrase "configured to" encompasses various physical and tangible mechanisms for performing an identified operation. The mechanisms can be configured to perform an operation using the hardware logic circuity 2014 of Section C. The term "logic" likewise encompasses various physical and tangible mechanisms for performing a task. For instance, each processing-related operation illustrated in the flowcharts of Section B corresponds to a logic component for performing that operation.

This description may have identified one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Further, the term "plurality" refers to two or more items, and does not necessarily imply "all" items of a particular kind, unless otherwise explicitly specified. Further, the descriptors "first," "second," "third," etc. are used to distinguish among different items, and do not imply an ordering among items, unless otherwise noted. The phrase "A and/or B" means A, or B, or A and B. Further, the terms "comprising," "including," and "having" are open-ended terms that are used to identify at least one part of a larger whole, but not necessarily all parts of the whole. Finally, the terms "exemplary" or "illustrative" refer to one implementation among potentially many implementations.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for performing machine-learning, comprising:
   obtaining first-type data items that pertain to a first type of data items;
   obtaining second-type data items that pertain to a second type of data items, the second type differing from the first type, the first-type data items and the second-type data items pertaining to at least one original subject matter domain;
   combining the first-type data items with first-type parameter information that pertains to the first type, to produce first-type supplemented data items;
   combining the second-type data items with second-type parameter information that pertains to the second type, to produce second-type supplemented data items;
   training an initial machine-learned model for use in each subject matter domain of said at least one original subject matter domain based on the plurality of first-type supplemented data items and the plurality of second-type supplemented data items, said training also resulting in training the first-type parameter information and the second-type parameter information;
   obtaining new-domain data items of at least the first type, the new-domain data items pertaining to a new subject matter domain that is not included in said at least one original subject matter domain;
   combining the new-domain data items of the first type with the first-type parameter information produced in said training, to produce supplemented new-domain data items; and
   refining the initial machine-learned model based on the supplemented new-domain data items, to produce a fine-tuned machine-learned model,
   the fine-tuned machine-learned model being configured, when deployed in an inference-stage system, to transform a new data item of the second type that is associated with the new subject matter domain into an output data item.

2. The method of claim 1,
   wherein there is at least a prescribed number of second-type data items for each subject matter domain of said at least one original subject matter domain, and
   wherein the fine-tuned machine-learned model is trained on a number of second-type data items pertaining to the new subject matter domain that is less than the prescribed number.

3. The method of claim 1,
   wherein the first-type data items that are obtained correspond to document text items, each document text item having been extracted from a document, and
   wherein the second-type data items that are obtained correspond to queries submitted to an automated query-processing engine.

4. The method of claim 1,
   wherein the method generates groups associated with different respective original subject matter domains, each group including a set of first-type data items pertaining to a particular original subject matter domain and a set of second-type data items pertaining to the particular original subject matter domain, and
   wherein said training of the initial machine-learned model trains the initial machine-learned model by processing the groups one after another, and by processing sets within each group one after another.

5. The method of claim 1,
   wherein said training of the initial machine-learned model performs a first training process for the first-type data items and a second training process for the second-type data items,
   wherein the first training process involves iteratively updating model weights of the initial machine-learned model, and iteratively updating the first-type parameter information, and
   wherein the second training process involves iteratively updating the second-type parameter information without updating the model weights of the initial machine-learned model.

6. The method of claim 1, wherein said refining involves iteratively updating model weights of the initial machine-learned model without updating parameter information.

7. The method of claim 1, wherein the inference-stage system includes a neural network that is configured based on the fine-tuned machine-learned model.

8. The method of claim 7, wherein the neural network is a transformer-based decoder neural network that autoregressively maps input text into output text.

9. The method of claim 1, wherein the inference-stage system operates by:
- obtaining the new data item of the second type;
- combining the new data item of the second type with the second-type parameter information that has been trained by said training, to produce a supplemented new data item; and
- mapping the supplemented new data item to the output data item using the fine-tuned machine-learned data model.

10. An inference-stage system that uses the fine-tuned machine-learned model produced using the method of claim 1.

11. An inference-stage system, comprising:
- a neural network that has been trained in a preceding training process on data items of different types, including at least a first type and a second type, the second type differing from the first type, the neural network being configured to perform a method comprising:
- inputting a new data item of the second type;
- combining the new data item with second-type parameter information that has been trained in the preceding training process, to produce a supplemented new data item; and
- mapping the supplemented new data item to an output data item based on model weights that have also been trained in the preceding training process,
- the preceding training process involving:
- training an initial machine-learned model based on first-type supplemented data items that pertain to the first type, and based on second-type supplemented data items that pertain to the second type, the first-type supplemented data items and the second-type supplemented data items pertaining to at least one original subject matter domain,
- the first-type supplemented data items being produced by combining respective first-type data items with first-type parameter information, and
- the second-type supplemented data items being produced by combining respective second-type data items with the second-type parameter information; and
- refining the initial machine-learned model based on supplemented new-domain data items to produce a fine-tuned machine-learned model, the supplemented new-domain data items pertaining to a new subject matter domain that is not included in said at least one original subject matter domain,
- said mapping using the fine-tuned machine-learned model to produce the output data item.

12. The inference-stage system of claim 11,
- wherein each first-type data item processed by the preceding training process corresponds to a document text item that has been extracted from a document, and
- wherein each second-type data item processed by the preceding training process corresponds a query submitted to an automated query-processing engine.

13. The inference-stage system of claim 11,
- wherein the preceding training process generates groups associated with different respective original subject matter domains, each group including a set of first-type data items pertaining to a particular original subject matter domain and a set of second-type data items pertaining to the particular original subject matter domain, and
- wherein said training of the initial machine-learned model trains the initial machine-learned model by processing the groups one after another, and by processing sets within each group one after another.

14. The inference-stage system of claim 11,
- wherein said training of the initial machine-learned model performs a first training process for first-type data items and a second training process for second-type data items,
- wherein the first training process involves iteratively updating model weights of the initial machine-learned model, and iteratively updating the first-type parameter information, and
- wherein the second training process involves iteratively updating the second-type parameter information without updating the model weights of the initial machine-learned model.

15. The inference-stage system of claim 11, wherein said refining involves iteratively updating model weights of the initial machine-learned model without updating the first-type parameter information and the second-type parameter information.

16. A non-transitory computer-readable storage medium for storing computer-readable instructions, the computer-readable instructions, when executed by one or more hardware processors, performing a method that comprises:
- obtaining document text items;
- obtaining queries, the document text items and the queries pertaining to at least one original subject matter domain;
- combining the document text items with text parameter information, to produce supplemented document text items;
- combining the queries with query parameter information, to produce supplemented queries;
- training an initial machine-learned model for use in each subject matter domain of said at least one original subject matter domain based on the supplemented document text items and the supplemented queries, said training also resulting in training the text parameter information and the query parameter information;
- obtaining new-domain document text items, the new-domain document text items pertaining to a new subject matter domain that is not included in said at least one original subject matter domain;
- combining the new-domain document text items with the text parameter information produced in said training, to produce supplemented new-domain document text items; and
- refining the initial machine-learned model based on the supplemented new-domain document text items, to produce a fine-tuned machine-learned model,
- the fine-tuned machine-learned model being configured, when deployed in an inference-stage system, to transform an input query that is associated with the new subject matter domain into a query suggestion.

17. The non-transitory computer-readable storage medium of claim 16,
- wherein there is at least a prescribed number of queries for each subject matter domain of said at least one original subject matter domain, and
- wherein the fine-tuned machine-learned model is trained on a number of queries pertaining to the new subject matter domain that is less than the prescribed number of queries.

18. The non-transitory computer-readable storage medium of claim 16,
- wherein the method generates groups associated with different respective original subject matter domains, each group including a set of document text items pertaining to a particular original subject matter domain and a set of queries pertaining to the particular original subject matter domain, and wherein said training of the initial machine-learned model trains the initial machine-learned model by processing the groups one after another, and by processing sets within each group one after another.

19. The non-transitory computer-readable storage medium of claim 16, wherein said training of the initial machine-learned model performs a first training process for the document text items and a second training process for the queries, wherein the first training process involves iteratively updating model weights of the initial machine-learned model, and iteratively updating the text parameter information, and wherein the second training process involves iteratively updating the query parameter information without updating the model weights of the initial machine-learned model.

20. The non-transitory computer-readable storage medium of claim 16, wherein said refining involves iteratively updating the model weights of the initial machine-learned model without updating the query parameter information and the text parameter information.

* * * * *